US012591450B2

(12) United States Patent
O'Grady et al.

(10) Patent No.: US 12,591,450 B2
(45) Date of Patent: Mar. 31, 2026

(54) FRAMEWORK FOR HIGH PERFORMANCE BLOCKCHAINS

(71) Applicant: Ava Labs, Inc., New York, NY (US)

(72) Inventors: Patrick Robert O'Grady, Palo Alto, CA (US); Stephen Buttolph, Brooklyn, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/250,276

(22) Filed: Jun. 26, 2025

(65) Prior Publication Data

US 2025/0321777 A1     Oct. 16, 2025

Related U.S. Application Data

(63) Continuation of application No. 18/667,008, filed on May 17, 2024, now Pat. No. 12,373,241.

(60) Provisional application No. 63/467,183, filed on May 17, 2023, provisional application No. 63/467,179, filed on May 17, 2023.

(51) Int. Cl.
| | |
|---|---|
| *G06F 9/455* | (2018.01) |
| *H04L 9/00* | (2022.01) |
| *H04L 67/10* | (2022.01) |

(52) U.S. Cl.
CPC ............ *G06F 9/45558* (2013.01); *H04L 9/50* (2022.05); *H04L 67/10* (2013.01); *G06F 2009/45562* (2013.01); *G06F 2009/45595* (2013.01)

(58) Field of Classification Search
CPC ....... G06F 9/45558; G06F 2009/45562; G06F 2009/45595; H04L 9/50; H04L 67/10
See application file for complete search history.

(56) References Cited

U.S. PATENT DOCUMENTS

| | | | |
|---|---|---|---|
| 12,120,246 B1 | 10/2024 | Kaplan et al. | |
| 12,373,241 B2 * | 7/2025 | O'Grady | H04L 67/10 |
| 2016/0028552 A1 * | 1/2016 | Spanos | H04L 9/3242 |
| | | | 713/178 |
| 2018/0157517 A1 | 6/2018 | Dong et al. | |
| 2018/0359096 A1 | 12/2018 | Ford et al. | |

(Continued)

FOREIGN PATENT DOCUMENTS

| | | |
|---|---|---|
| CN | 113282663 A | 8/2021 |

OTHER PUBLICATIONS

Thakkar et al., "Scaling Hyperledger Fabric Using Pipelined Execution and Sparse Peers", Mar. 2021, arXiv, pp. 1-13.*

(Continued)

*Primary Examiner* — Kenneth Tang
(74) *Attorney, Agent, or Firm* — McDermott Will & Schulte LLP

(57) ABSTRACT

A method for blockchain management includes receiving a first definition for a custom blockchain on a blockchain platform, the first definition including definitions for default data structures. The method further includes initializing a virtual machine and configuring the virtual machine using the first definition. The method further includes receiving a second definition for the custom blockchain, the second definition including definitions for user-defined data structures. The method further includes further configuring the virtual machine using the second definition and executing the custom blockchain on the virtual machine.

18 Claims, 3 Drawing Sheets

(56) References Cited

U.S. PATENT DOCUMENTS

| | | | | | |
|---|---|---|---|---|---|
| 2020/0028688 | A1* | 1/2020 | Takada | .................. | H04L 9/3247 |
| 2020/0133955 | A1* | 4/2020 | Padmanabhan | ....... | H04L 9/3218 |
| 2020/0151686 | A1 | 5/2020 | Komandur et al. | | |
| 2020/0242602 | A1 | 7/2020 | Jiang et al. | | |
| 2020/0250747 | A1 | 8/2020 | Padmanabhan | | |
| 2020/0344132 | A1* | 10/2020 | Padmanabhan | ....... | H04L 9/0637 |
| 2021/0184780 | A1* | 6/2021 | Yang | ..................... | H04L 9/0643 |
| 2021/0226951 | A1 | 7/2021 | Goldstein et al. | | |
| 2021/0289001 | A1 | 9/2021 | Wilson et al. | | |
| 2022/0006705 | A1* | 1/2022 | Padmanabhan | ....... | H04L 9/3239 |
| 2022/0182221 | A1* | 6/2022 | Wood | ...................... | G06F 21/64 |
| 2022/0263896 | A1* | 8/2022 | Shah | ....................... | H04L 69/08 |
| 2023/0033600 | A1* | 2/2023 | Nelson | .................. | H04L 9/3236 |
| 2023/0216947 | A1 | 7/2023 | Bernardi | | |
| 2024/0267412 | A1 | 8/2024 | Banerjee et al. | | |

OTHER PUBLICATIONS

International Search Report and Written Opinion for International Patent App. No. PCT/US2024/029996, mailed Aug. 28, 2024 (15 pages).
Young, M., Avalanche's HyperSDK blockchain upgrade hits 143K TPS on testnet. Cointelegraph, Sep. 11, 2023, 14 pages. Retrieved on Sep. 17, 2024 from <https://cointelegraph.com/news/avalanche-hyper-sdk-blockchain-upgrade-hits-143000-tps-on-testnet>.

* cited by examiner

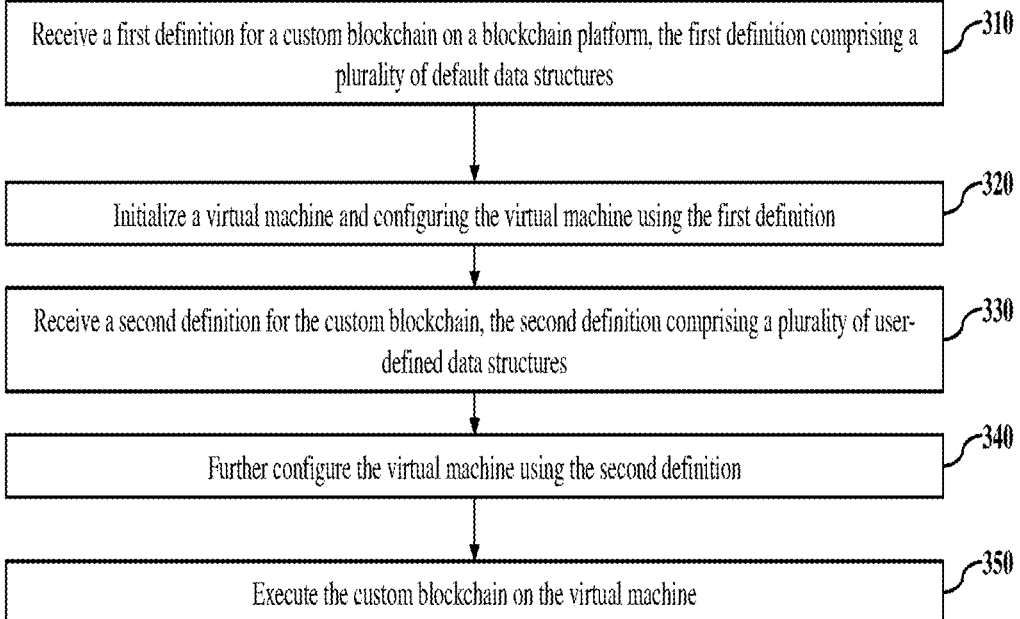

~ 200

Receive a first definition for a custom blockchain on a blockchain platform, the first definition comprising a plurality of default data structures ⌐310

Initialize a virtual machine and configuring the virtual machine using the first definition ⌐320

Receive a second definition for the custom blockchain, the second definition comprising a plurality of user-defined data structures ⌐330

Further configure the virtual machine using the second definition ⌐340

Execute the custom blockchain on the virtual machine ⌐350

FIG. 3

FRAMEWORK FOR HIGH PERFORMANCE BLOCKCHAINS

CROSS-REFERENCE OF RELATED APPLICATION

This application claims priority under 35 U.S.C. § 120 as a continuation of U.S. patent application Ser. No. 18/667, 008, filed May 17, 2024, which claims the benefit of U.S. Provisional Application No. 63/467,179 filed on May 17, 2023, and further claims the benefit of U.S. Provisional Application No. 63/467,183 filed on May 17, 2023, which are incorporated herein in their entirety.

TECHNICAL FIELD

The present disclosure generally relates to blockchain technology, and more particularly to frameworks for initializing and managing custom blockchains.

BACKGROUND

Creating a specialized Virtual Machine (VM), or blockchain runtime, is an aspect of building a high-performance blockchain. However, it is difficult and time-intensive to create a blockchain runtime from scratch. Forking existing VMs makes it easier to get started, but this may be time-consuming and complex to ensure correctness as changes occur upstream, often in code repositories that weren't meant to be used as a library.

As such, there is a need for better tools to create blockchains.

SUMMARY

Some embodiments of the present disclosure provide a method for blockchain management. The method includes receiving a first definition for a custom blockchain on a blockchain platform, the first definition including definitions for multiple default data structures. The method further includes initializing a virtual machine and configuring the virtual machine using the first definition. The method further includes receiving a second definition for the custom blockchain, the second definition including definitions for multiple user-defined data structures. The method further includes further configuring the virtual machine using the second definition and executing the custom blockchain on the virtual machine.

Some embodiments of the present disclosure provide a non-transitory computer-readable medium storing a program for blockchain management. The program, when executed by a computer, configures the computer to receive a first definition for a custom blockchain on a blockchain platform, the first definition including definitions for multiple default data structures. The program, when executed by a computer, further configures the computer to initialize a virtual machine and configure the virtual machine using the first definition. The program, when executed by a computer, further configures the computer to receive a second definition for the custom blockchain, the second definition including definitions for multiple user-defined data structures. The program, when executed by a computer, further configures the computer to further configure the virtual machine using the second definition and execute the custom blockchain on the virtual machine.

Some embodiments of the present disclosure provide a system for blockchain management. The system comprises a processor and a non-transitory computer readable medium storing a set of instructions, which when executed by the processor, configure the processor to receive a first definition for a custom blockchain on a blockchain platform, the first definition including definitions for multiple default data structures. The instructions, when executed by the processor, further configure the processor to initialize a virtual machine and configure the virtual machine using the first definition. The instructions, when executed by the processor, further configure the processor to receive a second definition for the custom blockchain, the second definition including definitions for multiple user-defined data structures. The instructions, when executed by the processor, further configure the processor to further configure the virtual machine using the second definition and execute the custom blockchain on the virtual machine.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 3 is a flowchart illustrating a process for blockchain management.

Figure 1:
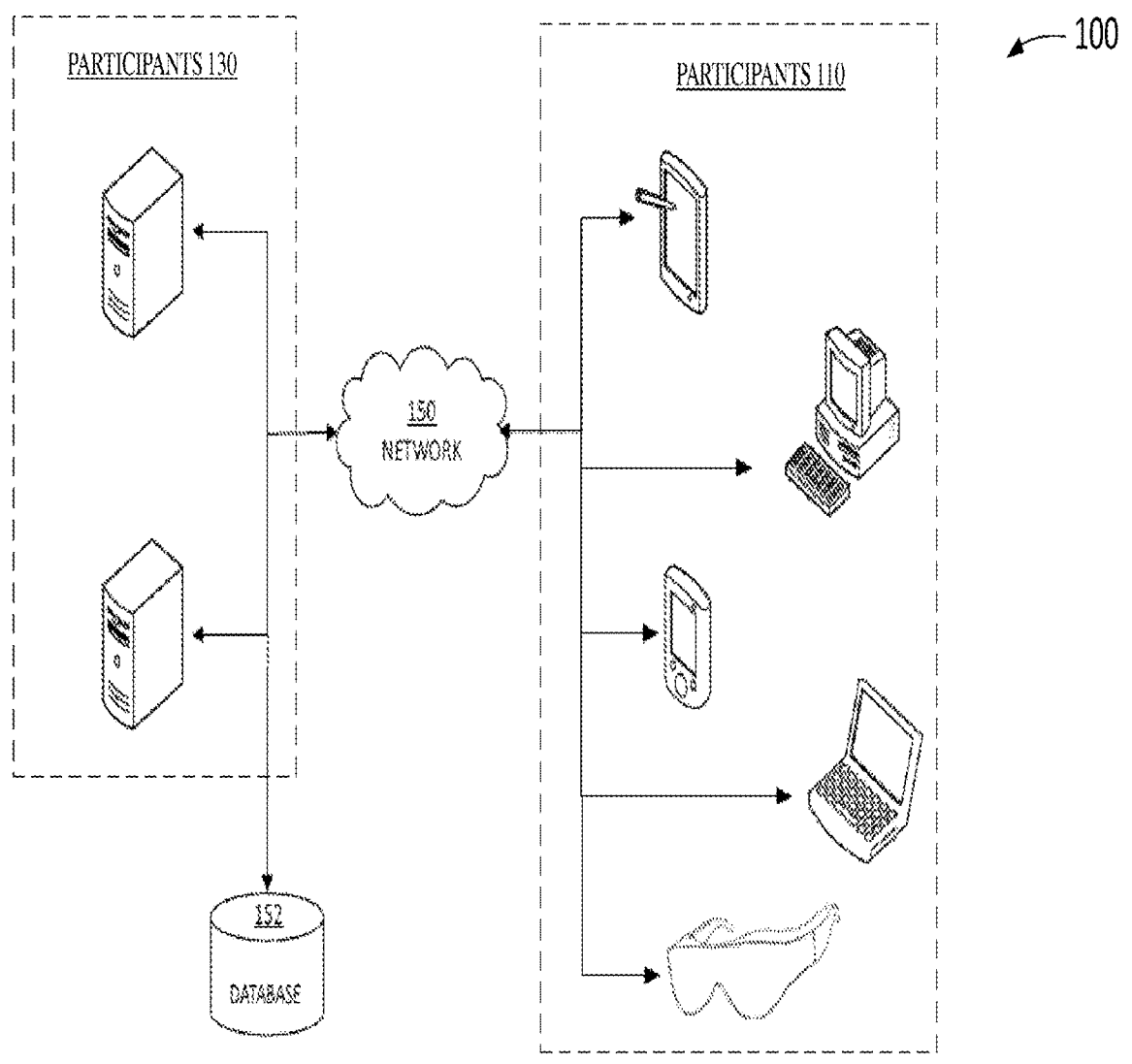
FIG. 1 illustrates a network architecture used to provide a blockchain platform, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

All references cited anywhere in this specification, including the Background and Detailed Description sections, are incorporated by reference as if each had been individually incorporated.

Embodiments, as disclosed herein, provide a solution to the above-mentioned problems rooted in computer technology, namely, providing a framework for building high-performance blockchains on a server.

Aspects of the present disclosure improve the functioning of the computer itself by increasing the speed of transactions on a blockchain network. As an example, some embodiments achieve 10,000 to 140,000 transactions per second, which is orders of magnitude faster than speed of transactions on other blockchain-based networks, such as Avalanche (4,500 transactions per second), Solana (2,000-3,000 transactions per second), and Ethereum (15-20 transactions per second) [1].

The disclosed subject technology further provides improvements to the technological field by allowing developers to quickly and efficiently build and deploy their own custom blockchains atop an existing blockchain network. These customizable blockchains can operate as an Ethereum Virtual Machine (EVM) or a customized Virtual Machine (VM), they can be public or private, and may be interoperable with the main blockchain network and any subnets on that main blockchain network. Blockchain builders can create specific features, deploy with the industry-leading scalability and speed, and attain flexibility to build a truly optimized user experience.

The term "blockchain" as used herein refers, according to some embodiments, to a database that maintains records for transactions and tracking of assets in blocks associated with users distributed across a blockchain network. Each blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example.

Blockchain platforms may utilize a consensus protocol as a building block for building distributed systems. As an example, a blockchain platform can include multiple blockchains (equivalently referred to as subnets), that can be used for different types of applications, including but not limited to a component exchange blockchain for creating and trading digital smart assets, a metadata blockchain for coordinating validators as well as tracking and creating subnets, and a contract blockchain for creating smart contracts on the blockchain network.

As used herein, the term "block" generally refers to a record that is kept in a blockchain. For example, each block contains a cryptographic hash of the previous block, a timestamp, and transaction data. The state of each block and/or the transaction data may be represented as a Merkle tree root hash.

The term "subnet" as used herein refers, according to some embodiments, to independent blockchain networks that run on top of the parent blockchain platform and allow developers and organizations to create custom blockchains with their own rules, consensus mechanisms, and token economics. A subnet includes a dynamic set of nodes (e.g., one or more validators) seeking to achieve consensus on a state of a set of blockchains such that one blockchain is validated by one subnet, although one subnet can validate multiple blockchains. A node can participate in the validation of multiple subnets and can be subject to requirements of the blockchains within those subnets, such as for security, licensing, hardware and/or the like. Subnets may be equivalently referred to herein as "subnetworks."

Blockchains being validated by validators may be of a blockchain network (or platform) with application-level logic defined by multiple virtual machines (VMs) which enable more decentralized networks. In particular, a blockchain may be an instance of a VM that specifies the blockchain's state, state transition function, transactions, and application programming interface (API) for user interaction. The VM allows for the execution of smart contracts and decentralized applications on the blockchain, providing a secure and deterministic environment for code execution and enabling interoperability between blockchains or cross-chain communication.

The term "framework" as used herein refers, according to some embodiments, to a software development kit (e.g., an open-source software platform) that provides the necessary infrastructure and standards for developing various blockchain-based systems and applications. A framework may be equivalently referred to herein as a "blockchain framework" or a "hyper framework."

The term "hyper framework" as used herein refers, according to some embodiments, to a framework (e.g., a software development kit, or SDK) for building high-performance blockchains on a blockchain platform. The hyper framework may be equivalently referred to herein as a "framework" or a "hypersdk."

The term "hyper VM" as used herein refers, according to some embodiments, to a blockchain Virtual Machine (VM) built using the hypersdk.

The term "hyper chain" as used herein refers, according to some embodiments, to a hyper VM deployed on a blockchain platform. In some embodiments, the hyper VM may be deployed on a blockchain platform that supports subnets.

Some embodiments provide a framework for faster, safer, and easier launching of optimized blockchains on a subnet. By hiding much of the complexity of building a blockchain runtime behind network-optimized data structures and algorithms, embodiments of the framework disclosed herein enables builders to focus their attention on the aspects of their runtime that make their project unique and override the defaults only if needed and/or desired. This design methodology enables runtimes built on the framework, called a hyperVM, to implement only a few hundred lines of custom code to add custom interaction patterns, without copying/pasting code from upstream that they must be kept up to date. However, anything being used upstream can always be overridden if a customized solution is better suited for the application.

As an example, a DEX-based project using the framework of some embodiments could focus entirely on implementing a novel trading system, and not have to spend development resources on transaction serialization, since that is already done efficiently by the framework. That same DEX-based project may wish to implement custom block building logic that prioritizes the inclusions of trades of certain partners or that interact with certain order books, overriding the block building logic from the framework. The usage of network-optimized data structures and algorithms means that the framework can process thousands of transactions per second "out of the box" without the DEX project developers needing to hire a team of engineers to optimize it or even understanding anything about how it works.

Launching a blockchain is the first step of a journey of continuous evolution. The hyper framework of some embodiments makes it straightforward and explicit to activate and/or deactivate any feature or configuration, thus making this evolution safe.

FIG. 1 illustrates a network architecture 100 used to implement a blockchain framework for creation and management of a blockchain on a subnet. Specifically, in this example, the network architecture 100 provides a blockchain implementation and deployment framework, according to some embodiments.

In the example of FIG. 1, the network architecture 100 includes one or more participants 110 and one or more participants 130 which are communicatively coupled through a network 150. The network 150 may include a wired network (e.g., via fiber optic or copper wire, telephone lines, and the like) and/or a wireless network (e.g., a satellite network, a cellular network, radiofrequency (RF) network, Wi-Fi, Bluetooth, and the like). The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, and/or the like. The participants 110 may be clients of the blockchain framework for creating, expanding, or otherwise modifying customized blockchain networks and/or private or public subnets.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may themselves be, or may execute, virtual machines (VMs) that function as nodes of one or more blockchains, and accordingly run software to verify block and transaction data, store data, validate, respond to network requests for data, execute smart contracts, and/or the like for their respective blockchain(s).

As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols.

The participants 130 may be configured to concurrently implement multiple blockchains of different types, including but not limited to an asset blockchain (e.g., for creating new assets, asset exchange, cross-subnet transfers), a metadata blockchain (e.g., for coordinating validators, tracking active subnets, and creating new subnets), and a smart contract blockchain (e.g., for creating smart contracts and applications that require total ordering).

Figure 2:
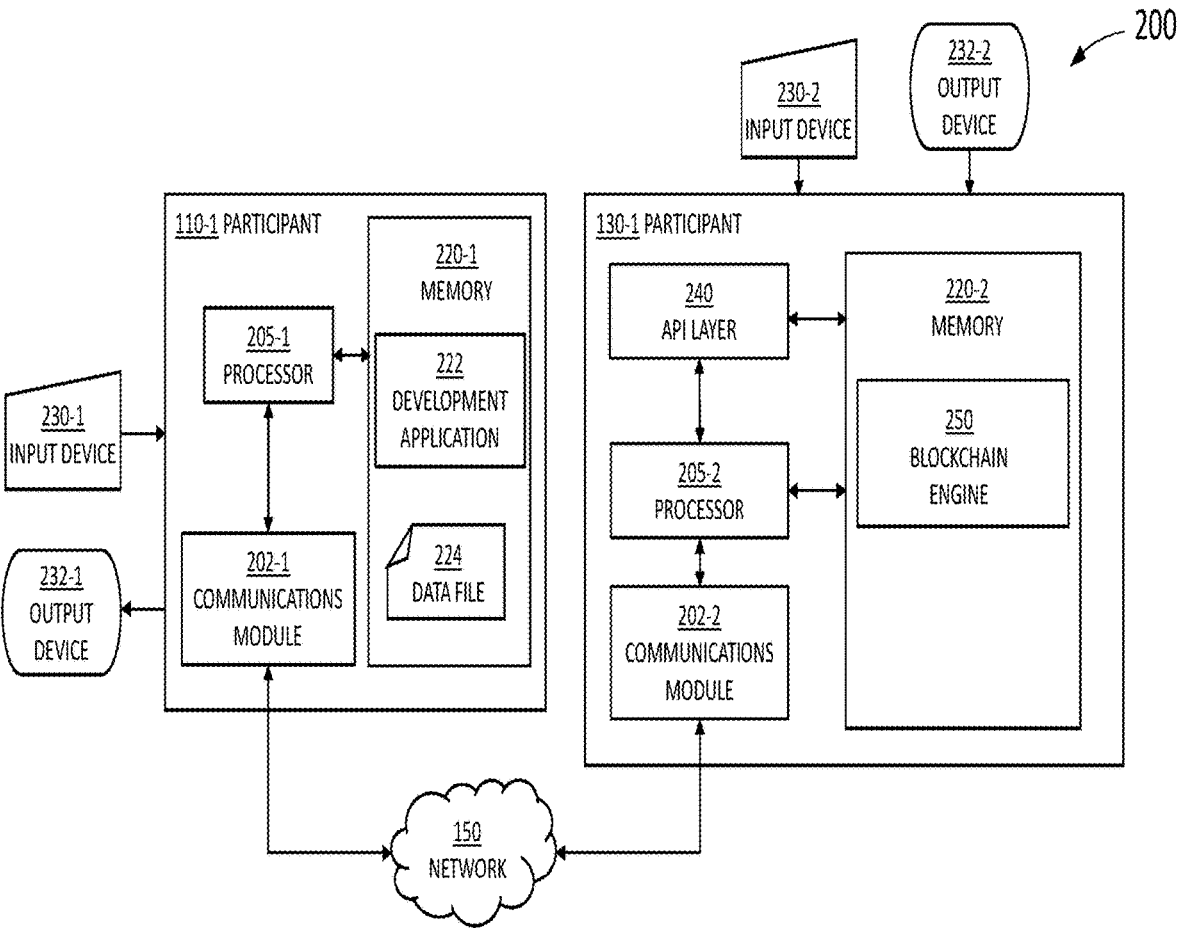
FIG. 2 is a block diagram illustrating details of a system for implementing a blockchain platform, according to some embodiments.

FIG. 2 is a block diagram illustrating details of a system 200 for implementing a blockchain framework, according to some embodiments. Specifically, the example of FIG. 2 illustrates an exemplary participant 110-1 (of the participants 110) and an exemplary participant 130-2 (of the participants 130) of the network architecture 100 of FIG. 1. The system 200 may implement protocols for blockchain-related consensus or messaging for any subnet or blockchain executing on the network architecture 100. A blockchain implemented on system 200 may include blockchains validated and secured by a primary subnet (e.g., primary network) comprising one or more of the participants 130 and/or participants 110. For example, in some embodiments, participant 110-1 and/or participant 130-1 may be configured to operate as blockchain validators to verify transactions on a blockchain.

The participant 110-1 and the participants 130-1 access each other and other devices in the network 150 via corresponding communications modules 202-1 and 202-2, respectively. The communications modules 202-1 and 202-2 may can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 205-1, 205-2 and memory 220-1, 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touchscreen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage the blockchain framework described herein by executing development application 222 executing within memory 220-1 and couple with input devices 230 and output devices 232. The development application 222 may be downloaded by a user from participant 130-1, and/or may be hosted by participant 130-1. The development application 222 includes specific instructions which, when executed by processor 205-1, perform operations consistent with embodiments of the present disclosure.

In some embodiments, the development application 222 runs on an operating system (OS) installed on participant 110-1. In some embodiments, development application 222 may run within a web browser. In some embodiments, the processor 205-1 is configured to control a graphical user interface (GUI) (spanning at least a portion of input devices 230 and output devices 232) for the user of participant 110-1 to access participant 130-1.

Data and files associated with the development application 222 may be stored in a local data file 224 stored in memory 220-1, a local database of participant 110-1 or participant 130-1, or an external database (e.g., database 152, a distributed database, and the like). The participant 110-1 may be used by a user of the blockchain framework to perform blockchain functions including, but not limited to, message transfer, exchange transactions, blockchain validation, block proposal, and the like.

Participant 130-1 includes an API layer 240, which may control the development application 222 in participant 110-

1. API layer 240 may also provide instructions, procedural information, updates, or the like to participant 110-1 as, e.g., new features are uploaded in the development application 222.

In some embodiments, memory 220-2 includes a blockchain engine 250. The blockchain engine 250 may be configured to perform methods and operations consistent with embodiments of the present disclosure. The blockchain engine 250 may share or provide features and resources with the client device, including data, libraries, and/or applications retrieved with blockchain engine 250 (e.g., development application 222). The user may access the blockchain engine 250 through the development application 222. Development application 222 may be installed in participant 110-1 by participant 130-1 and perform scripts and other routines provided by participant 130-1.

FIG. 3 is a flowchart illustrating a process 300 for blockchain management performed by a client device (e.g., participant 110-1, etc.) and/or a client server (e.g., participant 130-1, etc.), according to some embodiments. In some embodiments, one or more operations in process 300 may be performed by a processor circuit (e.g., processors 212, etc.) executing instructions stored in a memory circuit (e.g., memories 220, etc.) of a system (e.g., system 200, etc.) as disclosed herein. For example, operations in process 300 may be performed by development application 222, blockchain engine 250, or some combination thereof. Moreover, in some embodiments, a process consistent with this disclosure may include at least operations in process 300 performed in a different order, simultaneously, quasi-simultaneously, or overlapping in time.

At 310, the process 300 receives a first definition for a custom blockchain on a blockchain platform. The first definition includes definitions for multiple default data structures.

In some embodiments, the first definition includes a definition for a controller interface that initializes the default data structures during a configuration of the virtual machine using the first definition.

In some embodiments, the first definition includes a definition for a genesis interface that defines a list of initial account balances and a list of default configurations after the virtual machine is initialized.

In some embodiments, the default data structures may further configure the virtual machine to execute transactions in parallel and to perform deferred root generation.

In some embodiments, the default data structures may further configure the virtual machine to perform parallel signature verification and to perform batch signature verification.

In some embodiments, the default data structures may further configure the virtual machine to perform multidimensional fee pricing for transactions executed on the virtual machine.

At 320, the process 300 initializes a virtual machine and configures the virtual machine using the first definition.

At 330, the process 300 receives a second definition for the custom blockchain. The second definition includes definitions for multiple user-defined data structures.

In some embodiments, the second definition includes a definition for an action interface that defines how a user interacts with the custom blockchain. The action interface may define multiple blockchain actions, including but not limited to a cross-subnet messaging action, and an authentication action.

In some embodiments, the second definition includes a definition for an auth interface that defines authentication rules for blockchain actions. The auth interface may define an actor that participates in a particular blockchain action, and may further define a sponsor that pays fees associated with the particular blockchain action.

At 340, the process 300 further configures the virtual machine using the second definition.

At 350, the process 300 executes the custom blockchain on the virtual machine.

In some embodiments, the process 300 stores, in a data structure, data associated with a current state of the custom blockchain, and deletes, from the data structure, data that is no longer part of the current state. The process 300 may only synchronize most recent state data to the blockchain platform. In some embodiments, The process 300 receives new blockchain data, and in response to receiving the new blockchain data, performs a consensus operation and updates the current state without performing a validation operation on the new blockchain data.

In some embodiments, the process 300 receives a web assembly (WASM) binary file (also referred to as a "blob") that includes a smart contract. The process 300 may extract the smart contracts from the WASM blob and execute the smart contract.

Efficient State Management

In some embodiments, hyper chain states may be stored using a path-based merkelized radix tree implementation, which is a high-performance data structure that minimizes the on-disk footprint of any hyper VM out-of-the-box by deleting any data that is no longer part of the current state, without performing any costly reference counting. The use of this type of data structure in a blockchain context is to store state in a format that can be state-synchronized by other nodes with minimal overhead, using authenticated storage provided by the merkle trie.

Dynamic State Sync

In some embodiments, the hyper framework synchronizes the most recent state from the network, instead of requiring nodes to execute all previous transactions when joining any hyper chain (which may not be possible if there is very high throughput on a subnet). To avoid falling behind the network while synchronizing this state, the hyper framework may perform consensus on newly processed blocks without verifying them, updating its state synchronization target whenever a new block is accepted. The hyper framework may rely on a bandwidth aware dynamic sync implementation to synchronize to the tip of any hyper chain.

Block Pruning

In some embodiments, the hypersdk defaults to only storing what is necessary to build and/or verify the next block and to help new nodes sync the current state (not execute historical state transitions). By limiting block storage growth, the disk requirements for validators are prevented from growing and making it practical to execute the hypervm.

Consider an example where 25 k transactions per second are processed, each transaction being ~400 bytes. This would require the hypersdk to store 10 MB per second (not including any overhead in the database for doing so, or 864 GB per day (315.4 TB per year).

As an example, in some embodiments, when MinimumBlockGap=250 ms (minimum time between blocks), the hypersdk must store at least ~240 blocks to allow for the entire ValidityWindow to be backfilled (otherwise a fully-synced, restarting hypervm will not become "ready" until it accepts a block at least ValidityWindow after the last accepted block). To provide some room for error during disaster recovery (network outage), however, it is recommended to configure the hypersdk to store the last >=~50,000 accepted blocks (~3.5 hours of activity with a 250 ms MinimumBlockGap). This allows archival nodes that become disconnected from the network (due to a data center outage or bug) to ensure they can persist all historical blocks (which would otherwise be deleted by all participants and unindexable).

In some embodiments, the number of blocks that the hypersdk stores on-disk, the AcceptedBlockWindow, can be tuned by any hypervm to an arbitrary depth (or set to Maxint to keep all blocks). To limit disk IO used to serve blocks over the P2P network, hypervms can configure AcceptedBlockWindowCache to store recent blocks in memory.

Extending the Hypersdk without Changing the Hypervm

In some embodiments of the hypersdk, smart contracts (e.g. programs that run on blockchains) may be referred to as programs. Programs may be Web Assembly (WASM) based binaries that can be invoked during block execution to perform arbitrary state transitions. This may be a more flexible, yet less performant, alternative to defining all Auth and/or Actions that can be invoked in the hypervm in the hypervm's code.

In some embodiments, the hypersdk can execute arbitrary WASM, so that any language (Rust, C, C++, Zig, etc.) that can be compiled to WASM can be used to write programs.

Some embodiments use other technologies to extend the hypersdk without changing the hyperVM, including but not limited to RISC-V, the Ethereum Virtual Machine, and the like.

Account Abstraction

In some embodiments, the hyper framework makes no assumptions about how interactions with any hyper chain are verified. Rather, hyper VMs provide the hyper framework with a registry of supported Auth modules that can be used to validate each type of transaction. These Auth modules can perform simple things like signature verification or complex tasks like executing a Web Assembly (WASM) blob.

In some embodiments, the hypersdk provides out-of-the-box support for arbitrary transaction authorization logic. Each hypersdk transaction may include an Auth object that implements an Actor function (identity that participates in an Action) and a Sponsor function (identity that pays fees). These two identities could be the same (if using a simple signature verification Auth module) but may be different (if using a "gas relayer" Auth module).

In some embodiments, Auth modules may be hardcoded, or execute a program (i.e. a custom deployed multi-sig). To allow for interaction between different Auth modules (and to ensure Auth modules can't interfere with each other), in some embodiments the hypersdk employs a standard, 33-byte addressing scheme, for example: <typeID><ids.ID>. Transaction verification ensures that any Actor and Sponsor returned by an Auth module must have the same <typeID> as the module generating an address. The 32-byte hash (<ids.ID>) may be used to uniquely identify accounts within an Auth scheme. For programs, this may be the txID when the program was deployed and may be the hash of the public key for pure cryptographic primitives. An indirect benefit may be that account public keys are obfuscated until used.

It may be up to each Auth module to limit the computational complexity of Auth.Verify( ) to prevent a Denial of Service (DoS) (invalid Auth will not charge Auth.Sponsor( )).

Optimized Block Execution

In some embodiments, the hyper framework focuses on speed and scalability to enable developers to wrap their work in opinionated and performance-oriented abstractions. For developers, launching and maintaining their own blockchain can be as complex as desired to process thousands of transactions per second with low time-to-finality (latency). For this reason, the framework may be optimized towards making block verification and state management as fast and efficient as possible.

In some embodiments, state pre-fetching hyper framework transactions specify the keys they will touch in state (read or write) during execution and authentication so that all relevant data can be pre-fetched before block execution starts, which ensures all data accessed during verification of a block is done so in memory. In some embodiments, the keys specified here may not be keys in a merkle trie (which may be quite volatile) but are instead the actual keys used to access data by the storage engine (e.g., an address, which is much less volatile and not as cumbersome of a UX barrier).

This restriction may also enable transactions to be processed in parallel as distinct, ordered transaction sets that can be trivially formed by looking at the overlap of keys that transactions will touch. In some embodiments, the hyper framework may include parallel transaction execution, provided the grouping of transactions into execution sets prior to execution is faster than executing transactions serially with state pre-fetching.

Parallel Transaction Execution

In some embodiments, hypersdk transactions specify the keys they will access in state (read and/or write) during authentication and execution so that non-conflicting transactions can be processed in parallel. To do this efficiently, in some embodiments, the hypersdk uses an executor package, which can generate an execution plan for a set of transactions on-the-fly (no preprocessing required). The executor package may be used to parallelize execution in both block building and in block verification.

In embodiments where a hypervm's Auth and Actions are pre-specified, a primary benefit of parallel execution may be to concurrently fetch the state needed for execution (actual execution of precompiled code only takes nanoseconds). However, parallel execution massively speeds up the E2E execution of a block of programs, which may each take a few milliseconds to process. Consider a scenario where a program takes 2 milliseconds; processing 1000 programs in serial would take 2 seconds (far too long for a high-throughput blockchain). The same execution, however, would only take 125 milliseconds if run over 16 cores (assuming no conflicts).

In some embodiments, the number of cores that the hypersdk allocates to execution may be tuned by any hypervm using a TransactionExecutionCores configuration.

Deferred Root Generation

In some embodiments, all hypersdk blocks include a state root to support dynamic state sync. In dynamic state sync, the state target is updated to the root of the last accepted block while the sync is ongoing instead of staying pinned to the last accepted root when the sync started. Root block inclusion means consensus can be used to select the next state target to sync to instead of using some less secure, out-of-consensus mechanism (i.e. Avalanche Lite Client).

Dynamic state sync may be preferred for high-throughput blockchains because it may relieve the nodes that serve state sync queries from storing all historical state revisions. If a node doesn't update its sync target, any node serving requests would need to store revisions for at least as long as it takes to complete a sync, which may require significantly more storage.

An example of a stateful block according to some embodiments is given below:

```
type StatefulBlock struct {\
    Prnt ids.ID 'json:"parent"'
    Tmstmp int64 'json:"timestamp"'
    Hght uint64 'json:"height"'
    Txs [ ]*Transaction 'json:"txs"'
    StateRoot ids.ID 'json:"stateRoot"'
}
```

In some embodiments, blockchains that store a state root in the block may use the root of a merkle tree of state post-execution, however, this may require waiting for state merklization to complete before block verification can finish. If merklization was fast, this wouldn't be an issue, however, this process is typically the most time consuming aspect of block verification.

In some embodiments, hypersdk blocks include the merkle root of the post-execution state of a block's parent rather than a merkle root of their own post-execution state. This design may enable the hypersdk to generate the merkle root of a block's post-execution state anchronously while the consensus engine is working on other tasks that typically are network-bound rather than CPU-bound, like merklization, making better use of all available resources.

Parallel Signature Verification

In some embodiments an Auth interface (detailed below) may expose a function (referred to herein as AsyncVerify) that the hyper framework may call concurrently (may invoke on other transactions in the same block) at any time prior/during block execution. Some hyper VMs may perform signature verification in this function and save any state lookups for a full AuthVerify function (which has access to state, unlike Async Verify). Generic support for performing certain stateless activities during execution may greatly reduce the end-to-end (e2e) verification time of a block when running on powerful hardware.

Batch Signature Verification

In some embodiments, public-key signature systems, like Ed25519, may provide support for verifying batches of signatures, which can be more much efficient than verifying each signature individually. The hypersdk may generically support this capability for any Auth module that implements the AuthBatch Verifier interface, even parallelizing batch computation for systems that only use a single-thread to verify a batch.

Multidimensional Fee Pricing

In some embodiments, instead of mapping transaction resource usage to a one-dimensional unit (i.e. "gas" or "fuel"), the hypersdk utilizes multiple independently parameterized unit dimensions to meter activity on each hypervm. For example, these dimensions may include at least two of bandwidth, compute, storage[read], storage[allocate], and storage[write]. Each unit dimension may have a unique metering schedule (i.e. how many units each resource interaction costs), target, and max utilization per rolling 10 second window.

When network resources are independently metered, they can be granularly priced and thus better utilized by network participants. Consider an example of a one-dimensional fee mechanism where each byte is 2 units, each compute cycle is 5 units, each storage operation is 10 units, target usage is 7,500 units per block, and the max usage in any block is 10,000 units. If a user were to use 5,000 bytes of block data without utilizing any CPU/storing data in state, they would exhaust the block capacity without using 2 of the 3 available resources. This block would also increase the price of each unit because usage is above the target. As a result, the price to use compute and storage in the next block would be more expensive although neither has been used. In the hypersdk, only the price of bandwidth would go up and the price of CPU/storage would stay constant, a better reflection of supply/demand for each resource.

Accurate and granular resource metering is required to safely increase the throughput of a blockchain. Without such an approach, designers need to either overprovision the network to allow for one resource to be utilized to maximum capacity (max compute unit usage may also allow unsustainable state growth) or bound capacity to a level that leaves most resources unused.

Invisible Support

In some embodiments, multidimensional fees may be abstracted away from hypervm developers and managed entirely by the hypersdk. The hypervm designers may return the fee schedule, targets, and max usage to use in Rules (which allows values to change depending on timestamp) and the hypersdk may handle the rest:

```
GetMinUnitPrice( ) Dimensions
GetUnitPriceChangeDenominator( ) Dimensions
GetWindowTargetUnits( ) Dimensions
GetMaxBlockUnits( ) Dimensions
GetBaseComputeUnits( ) uint64
GetStorageKeyReadUnits( ) uint64
GetStorageValueReadUnits( ) uint64 // per chunk
GetStorageKeyAllocateUnits( ) uint64
GetStorageValueAllocateUnits( ) uint64 // per chunk
GetStorageKeyWriteUnits( ) uint64
GetStorageValueWriteUnits( ) uint64 // per chunk
An example configuration may be, in some embodiments:
MinUnitPrice: chain.Dimensions{ 100, 100, 100, 100, 100},
UnitPriceChangeDenominator: chain.Dimensions{ 48, 48, 48, 48, 48},
WindowTargetUnits: chain.Dimensions{20_000_000, 1_000, 1_000, 1_000,
1_000},
MaxBlockUnits: chain.Dimensions{1_800_000, 2_000, 2_000, 2_000, 2_000},
BaseComputeUnits: 1,
StorageKeyReadUnits: 5,
StorageValueReadUnits: 2,
```

-continued

```
StorageKeyAllocateUnits: 20,
StorageValueAllocateUnits: 5,
StorageKeyWriteUnits: 10,
StorageValueWriteUnits: 3,
```

Avoiding Complex Construction

In some embodiments, the hypersdk enables users to set a single Base.MaxFee field, denominated in tokens rather than usage. The hypersdk uses this fee to determine whether or not a transaction can be executed and then only charges what it actually used. For example, a user may specify to use up to 5 TKN but may only be charged 1 TKN, depending on their transaction's unit usage and the price of each unit dimension during execution. This approach is possible because the hypersdk requires transactions to be "fully specified" before execution (i.e. an executor can determine the maximum amount of units that will be used by each resource without simulating the transaction).

In some embodiments, the resource precomputation can be quite pessimistic (i.e. assumes the worse) and can lead to the maximum fee for a transaction being ~2x as large as the fee it uses on-chain (depending on the usage of cold/warm storage, as discussed later). In practice, this means that accounts may need a larger balance than they otherwise would to issue transactions (as the MaxFee must be payable during execution). In some embodiments, the user may specify a max usage of each unit dimension to better bound this pess1m1sm.

No Priority Fees

In some embodiments, transactions are executed in FIFO order by each validator and there a user cannot specify some "priority" fee to have their transaction included in a block sooner. If a transaction cannot be executed when it is pulled from the mempool (because its MaxFee is insufficient), it may be dropped and must be reissued.

Aside from FIFO handling being dramatically more efficient for each validator, price-sorted mempools are not more useful in high-throughput blockchains where the expected mempool size is ~0 or there is a bounded transaction lifetime (60 seconds by default on the hypersdk).

Separate Metering for Storage Reads, Allocates, Writes

In some embodiments, all storage operations (read, allocate, write) are unified into a single unit dimension. Fundamentally, it may be advantageous to combine resource usage into a single unit dimension if different operations are scaled substitutes of each other (an executor could translate between X units of one operation to Y units of another). It is not clear how to compare, for example, the verification of a signature with the storage of a new key in state but is clear how to compare the verification of a signature with the addition of two numbers (just different CPU cycle counts).

In other embodiments, separate metering is used for storage reads, allocates, and writes. Although more nuanced, the addition of new data to state is a categorically different operation than reading data from state and is not compared on a single plane. In other words, it may not be clear how many reads a developer would or should trade for writes and/or that they are substitutes for each other in some sort of disk resource (by mapping to a single unit dimension, performing a bunch of reads would make writes more expensive).

Size-Encoded Storage Keys

In some embodiments, to compute the maximum amount of storage units that a transaction could use, it may be possible to determine how much data a particular key can read/write from/to state. The hypersdk may require all state keys to be suffixed with a big-endian encoded uint16 of the number of "chunks" (each chunk is 64 bytes) that can be read/stored to satisfy this requirement. This appended size suffix is part of the key, so the same key with different size suffixes would be considered distinct keys.

This constraint is equivalent to deciding whether to use a uint8, uint16, uint32, uint64, etc. when storing an unsigned integer value in memory. The tighter a hypervm developer bounds the max chunks to the chunks they will store, the cheaper the estimate may be for a user to interact with state. Users may only be charged, however, based on the amount of chunks actually read/written from/to state.

Nonce-Less and Expiring Transactions

In some embodiments, hyper framework transactions may not use nonces to protect against replay attack like many other account-based blockchains. This means users may submit transactions concurrently from a single account, without worrying about ordering them properly or getting stuck on a transaction that was dropped by the memory pool.

Additionally, hyper framework transactions may contain a time past which they can no longer include inside of a hyper framework block. This makes it possible to take advantage of temporary situations on a hyper framework, such as wanting a transaction to be valid for only a few seconds. This also removes the need to broadcast replacement transactions in situations such as if the fee changes, a transaction needs to be canceled, and the like.

A lack of transaction nonces also may improve the performance of the memory pool, as it is no longer needed to maintain multiple transactions for a single account and ensure they are ordered. The network layer may also be more efficient as it can gossip any valid transaction to any node instead of just the transactions for each account that can be executed at the moment.

Easy Functionality Upgrades

In some embodiments, objects that appear on-chain (e.g., Actions and Auth) and other chain parameters (e.g., unit price) are scoped by block timestamp. This allows to easily modify existing rules (like how much people pay for certain types of transactions) or even disable certain types of Actions altogether.

Proposer-Aware Gossip

In some embodiments, the hyper framework gossips transactions to the next few preferred block proposers. This reduces the amount of unnecessary transaction gossip (e.g., gossiping a transaction to a node that will not produce a block during a transaction's validity period) for any out-of-the-box hyper chain.

Some embodiments employ a different gossiping mechanism (more aligned with the Actions defined in the hyper VM), users can always override the default gossip technique with their own. For example, some users may wish to not have node-to-node gossip and just require validators to propose blocks only with the transactions received over a remote procedure call (RPC).

Transaction Results and Execution Rollback

In some embodiments, the hyper framework allows for any Action to return a result from execution (which can be any arbitrary bytes), the amount of fee units it consumed, and whether or not it was successful (if unsuccessful, all state changes are rolled back). This support may be required by anyone using the hyper framework to implement a smart contract-based runtime that allows for cost-effective conditional execution, as exiting early if a condition does not hold can be much cheaper than the full execution of the transaction.

The outcome of execution may not be stored or indexed by the hyper framework. Unlike most other blockchains/ blockchain frameworks, which provide an optional "archival mode" for historical access, embodiments of the hyper framework only stores what is necessary to validate the next valid block and to help new nodes sync to the current state. Rather, the hyper framework may invoke the hyper VM with all execution results whenever a block is accepted for it to perform arbitrary operations (as required by a developer's use case). In this callback, a hyper VM could store results in a SQL database or write to a Kafka stream.

Support for Generic Storage Backends

When initializing a hyper VM, in some embodiments the developer may explicitly specify which storage back-ends to use for each object type (state vs blocks vs metadata). Experimental storage back-ends and/or traditional cloud infrastructure may be utilized as desired. For example, a hyper VM developer may wish to manage state objects (for the Path-Based Merkelized Radix Tree) on-disk but use cloud storage to store blocks and to store transaction metadata.

Continuous Block Production

In some embodiments, hypervms may produce blocks continuously, even if empty. This improves the "worst case" AWM verification cost (AWM verification requires creating a reverse diff to the last referenced P-Chain block), prevents a fallback to leaderless block production (which can lead to more rejected blocks), and avoids a prolonged post-bootstrap readiness wait (hypersdk waits to mark itself as ready until it has seen a ValidityWindow of blocks).

Some embodiments provide chain/validator-driven actions, to be included on-chain every X seconds (e.g., a price oracle update) regardless of how many user-submitted transactions are present.

Unified Metrics, Tracing, and Logging

It may not be possible to improve the performance of any runtime without detailed metrics and comprehensive tracing. For this reason, some embodiments of the hyper framework may provide both to any out-of-the-box hyper VM. These metrics and traces may be aggregated and accessed using an endpoint. Additionally, all logs in the hyper framework may use a standard logger and stored alongside all other runtime logs. The unification of all of these functions may enable existing monitoring tools to work out-of-the-box on the hyper VM.

Cross-Subnet Messaging Support

In some embodiments, the hyper framework may also support cross-subnet messaging, which enables any subnet to send arbitrary messages to any another subnet in seconds (or less) without relying on a trusted relayer or bridge. Only the validators of the subnet send the message.

In some embodiments, cross-subnet messaging is a primitive provided by the blockchain network to verify that a particular signature (e.g., a Boneh-Lynn-Shacham-BLS-multi-signature) is valid and signed by some percentage of the stake weight of a particular subnet (typically the subnet where the message originated). Specifying when a Custom VM produces a cross-subnet message for signing, defining the format of cross-subnet messages sent between subnets, implementing some mechanism to gather individual signatures from validators (to aggregate into a multi-signature) over this user-defined message, articulating how an imported cross-subnet message from another subnet is handled on a destination (if the destination chooses to even accept the message), and enabling retries in the case that a message is dropped or the multi-signature expires are just a few of the items that may be left to the implementer.

In some embodiments, the hyper framework handles the above tasks, except for defining when to emit a cross-subnet message to send to another subnet (e.g., what an export looks like on-chain), what this cross-subnet message should look like (e.g. what do should be sent to another subnet), and what should be done when a cross-subnet message is received (e.g., mint assets when an import is received).

Cross-subnet messaging is further described in U.S. patent application Ser. No. 18/615,932, which is incorporated herein by reference in its entirety.

Using the Hyper Framework

To use the hyper framework, several definitions may be imported into an hyper VM and the required interfaces implemented. Some definitions that a hyper VM may implement in some embodiments are shown below. The definitions may evolve over time, according to different and/or new implementations.

Definition: Controller

In some embodiments, the Controller is the entry point of the hypervm. It initializes the data structures utilized by the hypersdk and handles both Accepted and Rejected block callbacks. Some hypervms use the default Builder, Gossiper, Handlers, and Database packages.

```
type Controller interface {
    Initialize(
        inner *VM, // hypersdk VM
        snowCtx *snow.Context,
        gatherer ametrics.MultiGatherer,
        genesisBytes [ ]byte,
        upgradeBytes [ ]byte,
        configBytes [ ]byte,
    ) (
        config Config,
        genesis Genesis,
        builder builder.Builder,
        gossiper gossiper.Gossiper,
        vmDB database.Database,
        stateDB database.Database,
        handler Handlers,
        actionRegistry chain.ActionRegistry,
        authRegistry chain.AuthRegistry,
        err error,
    )
    Rules(t int64) chain.Rules
    StateManager( ) chain.StateManager
    Accepted(ctx context.Context, blk *chain.StatelessBlock) error
    Rejected(ctx context.Context, blk *chain.StatelessBlock) error
    Shutdown(context.Context) error
}
```

Definition: Registry

In some embodiments, ActionRegistry and AuthRegistry inform the hypersdk how to marshal/unmarshal bytes on-the-wire. If the Controller did not provide these, the hypersdk would not know how to extract anything from the bytes it was provided by the blockchain platform consensus engine.

Some embodiments include an option to automatically marshal/unmarshal objects if an ActionRegistry and/or AuthRegistry is not provided using a default codec.

```
ActionRegistry *codec.TypeParser[Action, *warp.Message, bool]
AuthRegistry *codec.TypeParser[Auth, *warp.Message, bool]
```

Definition: Genesis

In some embodiments, Genesis is the list of initial balances that accounts have at the start of the network and a list of default configurations that exist at the start of the network (fee price, enabled transactions, etc.). The serialized genesis of any hyper chain may be persisted on the P-Chain for anyone to see when the network is created.

```
type Genesis interface {
    GetHRP( ) string
    Load(context.Context, atrace.Tracer, chain.Database) error
}
```

Definition: Action

In some embodiments, actions are the heart of the hyper VM. They define how users interact with the blockchain runtime. Specifically, they may be a "user-defined" element of any hyper framework transaction that is processed by all participants of any hyper framework.

```
Action
type Action interface {
    MaxUnits(Rules) uint64
    ValidRange(Rules) (start int64, end int64)
    StateKeys(auth Auth, txID ids.ID) [ ][ ]byte
    Execute(
        ctx context.Context,
        r Rules,
        db Database,
        timestamp int64,
        auth Auth,
        txID ids.ID,
        warpVerified bool,
    ) (result *Result, err error)
    Marshal(p *codec.Packer)
}
```

Definition: Result

In some embodiments, Actions emit a Result at the end of their execution. This Result indicates if the execution was a Success (if not, all effects are rolled back), how many Units were used (failed execution may not use all units an Action requested), an Output (arbitrary bytes specific to the hyper VM), and optionally a WarpMessage (which Subnet Validators will sign).

```
type Result struct {
    Success bool
    Units uint64
    Output [ ]byte
    WarpMessage *warp.UnsignedMessage
}
```

Definition: Auth

In some embodiments, Auth shares many similarities with Action (recall that authentication is abstract and defined by the hypervm) but adds the notion of some abstract "payer" that must pay fees for the operations that occur in an Action. Any fees that are not consumed can be returned to said "payer" if specified in the corresponding Action that was authenticated.

The Auth mechanism is a powerful core module of the hypersdk because in some embodiments it lets the builder create arbitrary authentication rules that align with their goals. The Index VM, for example, allows users to rotate their keys and to enable others to perform specific actions on their behalf. It also lets accounts natively pay for the fees of other accounts. These features may be particularly useful for server-based accounts that want to implement a periodic key rotation scheme without losing the history of their rating activity on-chain (which determines their reputation).

Types of Auth include simple account signature Auth and delegate (acting on behalf of another account) Auth. The Index VM may provide an "authorize" Action that an account owner can call to perform any access control list (ACL) modifications.

```
type Auth interface {
    MaxUnits(Rules) uint64
    ValidRange(Rules) (start int64, end int64)
    StateKeys( ) [ ][ ]byte
    AsyncVerify(msg [ ]byte) error
    Verify(ctx context.Context, r Rules, db Database, action Action)
(units uint64, err error)
    Payer( ) [ ]byte
    CanDeduct(ctx context.Context, db Database, amount uint64) error
    Deduct(ctx context.Context, db Database, amount uint64) error
    Refund(ctx context.Context, db Database, amount uint64) error
    Marshal(p *codec.Packer)
}
```

Definition: Rules

In some embodiments, Rules govern block validity and are requested from the Controller prior to executing any block. The hyper framework may perform this request so that the Controller can modify any Rules on-the-fly. Many common rules may be provided directly in the interface but there may also be an option to provide custom rules that can be accessed during Auth or Action execution.

In the case of the Index VM, the custom rule support may be used to set the cost for adding anything to state (which is a very hyper VM-specific value).

```
type Rules interface {
    GetMaxBlockTxs( ) int
    GetMaxBlockUnits( ) uint64 // should ensure can't get above block
    max size
    GetValidityWindow( ) int64
    GetBaseUnits( ) uint64
    GetMinUnitPrice( ) uint64
    GetUnitPriceChangeDenominator( ) uint64
    GetWindowTargetUnits( ) uint64
    GetMinBlockCost( ) uint64
    GetBlockCostChangeDenominator( ) uint64
    GetWindowTargetBlocks( ) uint64
    GetWarpConfig(sourceChainID ids.ID) (bool, uint64, uint64)
    GetWarpBaseFee( ) uint64
    GetWarpFeePerSigner( ) uint64
    FetchCustom(string) (any, bool)
}
```

Definition: Cross Subnet Messaging

In some embodiments, to add cross subnet messaging support to a hyper VM, an implementer may first specify whether a particular Action/Auth item expects a *warp.Message when registering them with their corresponding registry (False, if no expected and True, if so):

```
ActionRegistry.Register(&actions.Transfer{ },
actions.UnmarshalTransfer, false)
ActionRegistry.Register(&actions.ImportAsset{ },
actions.UnmarshalImportAsset,
true)
```

The hyper framework may use this Boolean variable to enforce the existence/non-existence of a *warp.Message on the chain transaction that wraps the Action (marking a block as invalid if there is something unexpected). Actions may use the provided *warp.Message in their registered unmarshaler (in this case, the provided *warp.Message is parsed into a format specified by the token VM):

```
func UnmarshalImportAsset(p *codec.Packer, wm *warp.Message)
(chain.Action, error) {
    var (
        imp ImportAsset
        err error
    )
    imp.Fill = p.UnpackBool( )
    if err := p.Err( ); err != nil {
        return nil, err
    }
    imp.warpMessage = wm
    imp.warpTransfer, err =
UnmarshalWarpTransfer(imp.warpMessage.Payload)
    if err != nil {
        return nil, err
    }
    // Ensure we can fill the swap if it exists
    if imp.Fill && imp.warpTransfer.SwapIn == 0 {
        return nil, ErrNoSwapToFill
    }
    return &imp, nil
}
The WarpTransfer object may look like:
type WarpTransfer struct {
    To crypto.PublicKey `json:"to"`
    Asset ids.ID `json:"asset"`
    Value uint64 `json:"value"`
    // Return is set to true when a warp message is sending funds
    back to the
    // chain where they were created.
    Return bool `json:"return"`
    // Reward is the amount of [Asset] to send the [Actor] that submits
    this
    // transaction.
    Reward uint64 `json:"reward"`
    // SwapIn is the amount of [Asset] we are willing to swap for
    [AssetOut].
    SwapIn uint64 `json:"swapIn"`
    // AssetOut is the asset we are seeking to get for [SwapIn].
    AssetOut ids.ID `json:"assetOut"`
    // SwapOut is the amount of [AssetOut] we are seeking.
    SwapOut uint64 `json:"swapOut"`
    // SwapExpiry is the unix timestamp at which the swap becomes
invalid (and
    // the message can be processed without a swap.
    SwapExpiry int64 `json:"swapExpiry"`
    // TxID is the transaction that created this message. This is used to
    ensure
    // there is WarpID uniqueness.
    TxID ids.ID `json:"txID"`
}
```

As mentioned above, in some embodiments it is up to the hyper VM to implement a message format that it can understand, so that it can parse inbound AWM messages. In some embodiments, there may be common message definitions that will be compatible with most hyper VMs, and which are maintained in the hyper framework.

Other Features

Some embodiments use pre-specified state keys to process transactions in parallel. Transactions with no overlap can be processed at the same time, and/or create conflict sets on-the-fly instead of before execution.

Some embodiments add a WASM runtime module to allow developers to embed smart contract functionality in their hyper VMs.

Some embodiments overhaul streaming RPC (properly heartbeat and close connections).

Some embodiments implement concurrent state pre-fetching in chain/processor (blocked on x/merkled blocking improvements).

Some embodiments create an embedded explorer and wallet that is compatible with any hyper VM.

Some embodiments add support for Fixed-Fee Accounts (pay set unit price no matter what).

Some embodiments add a state processing loop that always prioritizes access by Verify and Build over handing Gossip and submit requests (can cause starvation of consensus process under load).

Some embodiments pre-fetch state during block production loop (may be slower, e.g. 30-40% slower, than normal execution).

Some embodiments user a memory arena (pre-allocated memory) to avoid needing to dynamically allocate memory during block and transaction parsing.

Some embodiments add a module that does Data Availability sampling on top of the networking interface exposed by AvalancheGo (only store hashes in blocks but leave VM to fetch pieces as needed on its own).

Some embodiments implement support for cloud storage and PostgreSQL storage back-ends.

Some embodiments provide optional auto-serialization/deserialization of Actions and Auth when only certain types are used in their definition.

Some embodiments add a module that could be used to track the location of various pieces of data across a network (e.g., consistent hasher) of hyper VM participants. This may be made abstract to any implementer such that they can just register and request data from it and it is automatically handled by the network layer.

Some embodiments make it possible for an operator to use a single backend (like cloud storage) to power storage from multiple hosts.

Some embodiments separate a block into TxBlocks and RootBlocks. TxBlocks may contain all transmit information but don't include any state roots. RootBlocks link to a set of TxBlocks that make up a block and include a state root. This approach may enable production of blocks much larger than 2 MB (AvalancheGo network limit) and to verify blocks while they are still being produced (can stream produced TxBlocks).

EXAMPLES

First Example/Use Case Application: Morpheus
VM

An exemplary hyper VM of some embodiments is a Morpheus VM, which is a template VM for creating a custom blockchain.

Morpheus VM Demos

A Morpheus VM subnet may be launched in some embodiments by running the following command:

./scripts/run.sh

When the Subnet is running, the following logs are emitted:

```
cluster is ready!
avalanche-network-runner is running in the background...
use the following command to terminate:
./scripts/stop.sh;
```

By default, this allocates all funds on the network to:

morpheus1qrzvk4zlwj9zsacqgtufx7zvapd3qu-
ufqpxk5rsdd4633m4wz2fdjk97rwu

The private key for this address is:

0x323bld8f4eed5f0da9da93071b034f2dce9d2d226-
92c172f3cb252a64ddfafd0lb057de320297c29ad-
0c1f589ea216869cf1938d88c9fbd70d6748323dbf2fa7.

Build Command Line Interface

To make it easy to interact with the Morpheus VM, some embodiments provide a CLI (here named "morpheus-cli"). In some embodiments, the following command may be used to build the CLI:

./scripts/build.sh

This command will put the compiled CLI in location./build/token-cli.

Configure Command Line Interface

In some embodiments, the newly created chains and the default key to the morpheus-cli may also be added using the following command:

./build/morpheus-cli key import ed25519 demo.pk

When the key is added correctly, the following logs are emitted:

```
database: .morpheus-cli
imported address:
morpheuslqrzvk4zlwj9zsacqgtufx7zvapd3quufqpxk5rsdd4633m4wz2fdjk97rwu
```

In some embodiments, to store the URLs of the nodes running on the Subnet, the following command may be run:

```
./build/morpheus-cli chain import-anr, the following logs may be emitted:
database: .morpheus-cli
stored chainID:
2mQy8Q9Af9dtZvVM8pKsh2rB3cT3QNLjghpet5Mm5db4N7Hwgk uri:
http://127.0.0.1:45778/ext/bc/2mQy8Q9Af9dtZvVM8pKsh2rB3cT3QNLjghpet5Mm5db4N7H
wgk
    stored chainID:
2mQy8Q9Af9dtZvVM8pKsh2rB3cT3QNLjghpet5Mm5db4N7Hwgk uri:
http://127.0.0.1:58191/ext/bc/2mQy8Q9Af9dtZvVM8pKsh2rB3cT3QNLjghpet5Mm5db4N7H
wgk
    stored chainID:
2mQy8Q9Af9dtZvVM8pKsh2rB3cT3QNLjghpet5Mm5db4N7Hwgk uri:
http://127.0.0.1:16561/ext/bc/2mQy8Q9Af9dtZvVM8pKsh2rB3cT3QNLjghpet5Mm5db4N7H
wgk
    stored chainID:
2mQy8Q9Af9dtZvVM8pKsh2rB3cT3QNLjghpet5Mm5db4N7Hwgk uri:
http://127.0.0.1:14628/ext/bc/2mQy8Q9Af9dtZvVM8pKsh2rB3cT3QNLjghpet5Mm5db4N7H
wgk
    stored chain/D:
2mQy8Q9Af9dtZvVM8pKsh2rB3cT3QNLjghpet5Mm5db4N7Hwgk uri:
http://127.0.0.1:44160/ext/bc/2mQy8Q9Af9dtZvVM8pKsh2rB3cT3QNLjghpet5Mm5db4N7Hwgk
```

Check Balance

To confirm that everything has been setup correctly up to this point, the following command may be run to get the current balance of the key that was added:

```
./build/morpheus-cli key balance
If successful, the balance response may look like this:
database: .morpheus-cli
address:morpheus1qrzvk4zlwj9zsacqgtufx7zvapd3quufqpxk5rsdd4633m4wz2fdjk9
7rwu
    chainID: 2mQy8Q9Af9dtZvVM8pKsh2rB3cT3QNLjghpet5Mm5db4N7Hwgk
    uri:
http://127.0.0.1:45778/ext/bc/2mQy8Q9Af9dtZvVM8pKsh2rB3cT3QNLjghpet5Mm5db4N7H
wgk
    balance: 1000.000000000 RED
```

Generate Another Address

Now that a balance exists to send, another address can be generated to send to. Because we use bech32 addresses, a random string of characters as the recipient cannot be used, as it would not pass checksum test that protects users from sending to off-by-one addresses. In some embodiments, the recipient address may be generated using the following command:

./build/morpheus-cli key generate secp256r1

If successful, the morpheus-cli will emit the generated address:

```
database: .morpheus-cli
created address:
morpheuslq8rc050907hx39vfejpawjydmwe6uujw0njx9s6skzdpp3cm2he5s036p07
```

By default in some embodiments, the morpheus-cli may set newly generated addresses to be the default. The following command may be run to set it back to demo.pk:

./build/morpheus-cli key set

Resulting in the following output:

```
database: .morpheus-cli
chain/D: 2mQy8Q9Af9dtZvVM8pKsh2rB3cT3QNLjghpet5Mm5db4N7Hwgk
stored keys: 2
0) address (ed25519):
morpheuslqrzvk4złwj9zsacqgtufx7zvapd3quufqpxk5rsdd4633m4wz2fdjk97rwu balance:
10000000000.000000000 RED
1) address ( secp256r1 ):
morpheuslq8rc050907hx39vfejpawjydmwebuujw0njx9s6skzdpp3cm2he5s036p07 balance:
0.000000000 RED
set default key: 0
```

Send Tokens

The transfer may be triggered using the following command:

./build/morpheus-cli action transfer

The morpheus-cli may emit the following logs when the transfer is successful:

```
database: .morpheus-cli
address:
morpheusl qqds2l0ryq5hc2ddps04384zz6rfeuvn3kyvn77hp4n5sv3ahuh6wgkt57y
chain/D: 2mQy8Q9Af9dtZvVM8pKsh2rB3cT3QNLjghpet5Mm5db4N7Hwgk
balance: 1000.000000000 RED
recipient:
morpheusl q8rc050907hx39vfejpawjydmwe6uujw0njx9s6skzdpp3cm2he5s036p07
amount: 10
continue (y/n): y
tx/D: sceRdaoqu2AAyLdHCdQkENZaXngGjRoc8nFdGyG8D9pCbTjbk
```

Watching Activity in Real-Time

To provide a better sense of what is actually happening on-chain, in some embodiments the morpheus-cli includes an explorer that logs all blocks/txs that occur on-chain. This utility may be run by running the following command:

./build/morpheus-cli chain watch

The utility runs until the network shuts down or the command is exited. An example of output generated by the command is as follows:

database: .morpheus-cli
available chains: 1 excluded: [ ]
0) chain/D:
2mQy8Q9Af9dtZvVM8pKsh2rB3cT3QNLjghpet5Mm5db4N7Hwgk
select chainID: 0
uri:
http:l/127.0.0.1:45778/ext/bc/2mQy8Q9Af9dtZvVM8pKsh2rB3cT3QNLjghpet5Mm5db4N7H
wgk
watching for new blocks on
2mQy8Q9Af9dtZvVM8pKsh2rB3cT3QNLjghpet5Mm5db4N7Hwgk
height:] txs:1 units:440
root:WspVPrHNAwBcJRJPVwt7TW6WT4E74dN8DuD3WXueQTMt5FDdi
sceRdaoqu2AAyLdHCdQkENZaXngGjRoc8nFdGyG8D9pCbTjbk actor:
morpheusl qrzvk4zlwj9zsacqgtufx7zvapd3quufqpxk5rsdd4633m4wz2fdjk97rwu units: 440
summary (*actions.Transfer): [10.000000000 RED ->
morpheusl q8rc050907hx39vfejpawjydmwe6uujw0njx9s6skzdpp3cm2he5s036p07]

Second Example/Use Case Application: Token VM

An exemplary hyper VM of some embodiments is a Token VM, for token minting and trading. The Token VM lets anyone create any asset, mint more of their asset, modify the metadata of their asset (if they reveal some info), and burn their asset. Additionally, there may be an embedded on-chain exchange that allows anyone to create orders and fill (partial) orders of anyone else. In some embodiments, the Token VM may also bundle a command-line interface (CLI) tool and serves remote procedure call (RPC) requests for trades out of an in-memory order book maintained by synchronizing blocks. To ensure the hyper framework remains reliable as the codebase is updated and optimized, the hyper framework may run E2E tests in the Token VM on each pull request (PR) to the core modules in the hyper framework.

Features of Token VM

1. Arbitrary Token Minting

Embodiments of Token VM provide the ability to create, mint, and transfer user-generated tokens. When creating an asset, the owner is given "admin control" of the asset functions and can later mint more of an asset, update its metadata (during a reveal for example), or transfer/revoke ownership (if rotating their key or turning over to their community).

Assets may be a native feature of the Token VM and the storage engine optimized specifically to support their efficient usage. Each balance entry requires only 72 bytes of state:

assetID|publicKey=>balance(uint64).

This storage format makes it possible to parallelize the execution of any transfers that don't touch the same accounts. This parallelism can take effect as soon as it is re-added upstream by the hyper framework, with no action required in the Token VM.

2. Trading Any 2 Tokens

Some embodiments of Token VM also provide support for fully on-chain trading. Anyone can create an "offer" with a rate/token they are willing to accept and anyone else can fill that "offer" if they find it interesting. The Token VM may also maintain an in-memory order book to serve over RPC for clients looking to interact with these orders.

Orders may be a native feature of the Token VM and the storage engine may be optimized specifically to support their efficient usage (just like balances above). Each order requires only 152 bytes of state:

orderID=>inAssetlinTickloutAssetloutTicklremaininglowner

This storage format may also make it possible to parallelize the execution of any fills that don't touch the same order. There may be hundreds or thousands of orders for the same pair, so this still allows parallelization within a single pair unlike a pool-based trading mechanism like an AMM. This parallelism may take effect as soon as it is re-added upstream by the hyper framework, with no action required in the Token VM.

A. In-Memory Order Book

To make it easier for clients to interact with the Token VM, it may come bundled with an in-memory order book that listens for orders submitted on-chain for any specified list of pairs (or all if preferred). Behind the scenes, this may use the hyper framework support for feeding accepted transactions to any hyper framework, where the Token VM, in this case, uses the data to keep its in-memory record of order state up to date. The implementation of this is a simple max heap per pair where the best on the best "rate" is arranged for a given asset (in/out).

B. Sandwich-Resistant

In some embodiments, a fill must explicitly specify an order to interact with, since it is up the client/CL! to implement a trading agent to perform a trade that may span multiple orders. It would not possible for a bot to jump ahead of a transaction to negatively impact the price of the execution, as all trades with an order occur at the same price. The worst they can do is to reduce the amount of tokens available to trade with the order, as they may consume some of the remaining supply.

Not allowing the chain or block producer to have any control over what orders a transaction may fill is a design decision of some embodiments of the Token VM and what makes its trading support useful in a world where producers are willing to manipulate transactions for their gain.

C. Partial Fills and Fill Refunds

In some embodiments, anyone filling an order does not need to fill an entire order. Likewise, if there is an attempt to "overfill" an order the Token VM will refund any extra input that was not used. This is important in a blockchain-context because someone may interact with an order just before attempting to acquire any remaining tokens. It would be undesirable for all the assets pledged for the fill that weren't used, to disappear.

D. Expiring Fills

In some embodiments, because of the format of hyper framework transactions, fills can be scoped to be valid only until a particular time. This enables going for orders at the time and not having to worry about the fill sitting around until explicitly canceled or replaced.

Token VM Demos

A Token VM subnet may be launched in some embodiments by running the following command:

./scripts/run.sh

By default, this allocates all funds on the network to:

token1rvzhmceq997zntgvravfagsks6w0ryud3rylh4-
cdvayry0dl97nsjzf3yp.

The private key for this address is:

0x323bld8f4eed5f0da9da93071b034f2dce9d2d22-
692c172f3cb252a64ddfafd0lb057de320297c29a-
d0clf589ea216869cf1938d88c9fbd70d6748323dbf2fa7.

To make it easy to interact with the Token VM, some embodiments provide a CLI (here named "token-cli"). In some embodiments, the following command may be used to build the CLI:

./scripts/build.sh

This command will put the compiled CLI in location./ build/token-cli. In some embodiments, the newly created chains and the default key to the token-cli may also be added using the following command:

```
./build/token-cli key import demo.pk
./build/token-cli chain import-anr
``` where the command "chain import-am" connects to a server running in the background and pulls the URis of all nodes tracking each chain that was created.

1. Minting and Trading with Token VM

Step 1: Create the Asset

In some embodiments, an asset may be created by running the following command:

./build/token-cli action create-asset

An example of output generated by the command is as follows:

```
database: .token-cli
address: token1rvzhmceq997zntgvravfagsks6w0ryud3rylh4cdvayry0dl97nsjzf3yp
chainID: Em2pZtHr7rDCzii43an2bBi1M2mTFyLN33QP1Xfjy7BcWtaH9
metadata (can be changed later): MarioCoin
continue (y/n): y
txID: 27grFs9vE2YP9kwLM5hQJGLDvqEY9ii71zzdoRHNGC4Appavug
```

In this example, txID is the assetlD of the new asset. The "loaded address" is the address of the default private key (demo.pk) used to authenticate all interactions with the Token VM.

Step 2: Mint the Asset

After the asset is created, it can be minted. In some embodiments, the asset is minted by running the following command:

```
./build/token-di action mint-asset
An example of output generated by the command is as follows:
database: token-di
address: token1rvzhmceq997zntgvravfagsks6w0ryud3rylh4cdvayry0d197nsjzf3yp
chainID: Em2pZtHr7rDCzii43an2bBilM2mTFyLN33QP1Xfjy7BcWtaH9
assetID: 27grFs9vE2YP9kwLM5hQJGLDvqEY9ii71zzdoRHNGC4Appavug
metadata: MarioCoin
supply: 0
recipient:
token1rvzhmceq997zntgvravfagsks6w0ryud3rylh4cdvayry0d197nsjzf3yp
amount: 10000
continue (y/n): y
txID: XlE5CVFgFFgniFyWcj5wweGg66TyzjK2bMWWTzFwJcwFYkF72
```

Note that in this example, the recipient is the creator's own address, though this is not always the case and any target address may be provided.

Step 3: Checking the Balance

To verify that the mint worked, the balance may checked in some embodiments by running the following command:

```
./build/token-di key balance
An example of output generated by the command is as follows:
database: .token-di
address: tokenlrvzhmceq997zntgvravfagsks6w0ryud3rylh4cdvayry0d197nsjzf3yp
chainID: Em2pZtHr7rDCzii43an2bBilM2mTFyLN33QP1Xfjy7BcWtaH9
assetID (use TKN for native token):
27grFs9vE2YP9kwLM5hQJGLDvqEY9ii71zzdoRHNGC4Appavug
metadata: Mario Coin
supply: 10000
warp: false
balance: 10000
27grFs9vE2YP9kwLM5hQJGLDvqEY9ii71zzdoRHNGC4Appavug
```

Step 4: Creating an Order

In some embodiments, an order may be put on-chain that will allow someone to trade the native token (TKN), by running the following command:

```
./build/token-di action create-order
An example of output generated by the command is as follows:
database: .token-di
address: tokenlrvzhmceq997zntgvravfagsks6w0ryud3rylh4cdvayry0d197nsjzf3yp
chainID: Em2pZtHr7rDCzii43an2bBilM2mTFyLN33QP1Xfjy7BcWtaH9in
assetID (use TKN for native token): TKN
in tick: 1
out assetID (use TKN for native token):
27grFs9vE2YP9kwLM5hQJGLDvqEY9ii71zzdoRHNGC4Appavug
metadata: Mario Coin
supply: 10000
warp: false
balance: 10000
27grFs9vE2YP9kwLM5hQJGLDvqEY9ii71zzdoRHNGC4Appavug
out tick: 10
supply (must be multiple of out tick): 100
continue (y/n): y
txID: 2TdeT2ZsQtJhbWJuhLZ3eexuCY4UP6W7q5ZiAHMYtVfSSplids
```

In this example, txID is the orderID of the new order, and the "in tick" is how much of the "in assetID" that someone must trade to get "out tick" of the "out assetID". Any fill of this order must send a multiple of "in tick" to be considered valid to avoid precision issues with computing decimal rates on-chain.

Step 5: Filling Part of the Order

In some embodiments, the part of the on-chain order is filled by running the following command:

```
./build/token-cli action fill-order
An example of output generated by the command is as follows:
database: .token-cli
address: tokenlrvzhmceq997zntgvravfagsks6w0ryud3rylh4cdvayry0dl97nsjzf3yp
chainID: Em2pZtHr7rDCzii43an2bBi1M2mTFyLN33QP1Xfjy7BcWtaH9in
assetID (use TKN for native token): TKN
balance: 997.999993843 TKN
out assetID (use TKN for native token):
27grFs9vE2YP9kwLM5hQJGLDvqEY9ii71zzdoRHNGC4Appavug
metadata: Mario Coin
supply: 10000
warp: false
available orders: 1
0)Rate(in/out): 100000000.0000
InTick: 1.000000000 TKN
OutTick: 10
27grFs9vE2YP9kwLM5hQJGLDvqEY9ii71zzdoRHNGC4Appavug Remaining:
100
27grFs9vE2YP9kwLM5hQJGLDvqEY9ii71zzdoRHNGC4Appavug
select order: 0
value (must be multiple of in tick): 2
```

-continued

```
in: 2.000000000 TKN
out: 20 27grFs9vE2YP9kwLM5hQJGLDvqEY9ii71zzdoRHNGC4Appavug
continue (y/n): y
txID: uw9YrZcs4QQTEBSR3guVnzQTFyKKm5QFGVTvuGyntSTrx3aGm
```

In this example, all available orders for this pair are listed by the CLI. These come from the in-memory order book maintained by the Token VM.

Step 6: Closing Order

In some embodiments, canceling the order so that others are no longer allowed to fill the order is done by running the following command:

./build/token-di action close-order

An example of output generated by the command is as follows:

```
database: .token-cli
    address: tokenlrvzhmceq997zntgvravfagsks6w0ryud3rylh4cdvayry0dl97nsjzf3yp
    chainID: Em2pZtHr7rDCzii43an2bBilM2mTFyLN33QP1Xfjy7BcWtaH9
    orderID: 2TdeT2ZsQtJhbWJuhLZ3eexuCY4UP6W7q5ZiAHMYtVfSSplids
    out assetID (use TKN for native token):
27grFs9vE2YP9kwLM5hQJGLDvqEY9ii71zzdoRHNGC4Appavug
    continue (y/n): y
    txID: poGnxYiLZAruurNjugTPfN1JjwSZzGZdZnBEezp5HB98PhKcn
```

Any funds that were locked up in the order will be returned to the creator's account.

Watching Activity in Real-Time

To provide a better sense of what is actually happening on-chain, in some embodiments the index-di includes an explorer that logs all blocks/txs that occur on-chain. This utility may be run by running the following command:

./build/token-di chain watch

The utility runs until the network shuts down or the command is exited. An example of output generated by the command is as follows:

```
database: .token-cli
    available chains: 2 excluded: [ ]
    0) chainID: Em2pZtHr7rDCzii43an2bBilM2mTFyLN33QP1Xfjy7BcWtaH9
    1) chainID:
cKVefMmNPSKmLoshR15Fzxmx52Y5yUSPqWiJsNFUg1WgNQVMX
    select chainID: 0
    watching for new blocks on
Em2pZtHr7rDCzii43an2bBilM2mTFyLN33QP1Xfjy7BcWtaH9 height:13 txs:1 units:488
root:2poln8rqdpNuwpMGndqC2hjt6Xa3cUDsjEpm7D6u9kJRFEPmdL avg TPS:0.026082
    2Qbl 72jGBtjTTLhrzYD8ZLatjg6FFmbiFSP6CBq2Xy4aBV2WxL
actor:tokenlrvzhmceq997zntgvravfagsks6w0ryud3rylh4cdvayry0dl97nsjzf3yp units: 488
summary (*actions.CreateOrder): [1.000000000 TKN -> 10
27grFs9vE2YP9kwLM5hQJGLDvqEY9ii71zzdoRHNGC4Appavug (supply: 50
27grFs9vE2YP9kwLM5hQJGLDvqEY9ii7 1zzdoRHNGC4Appavug)] height:14 txs:1
units:1536 root:2vqraWhyd98zVk2ALMmbHPApXjjvHpxh4K4ul QhSb6i3w4VZxM
avgTPS:0.030317
    2H7wiE5MyM4JfRgoXPVP1GkrrhoSXL25iDPJ1wEiWRXkELlCWz
actor:tokenlrvzhmceq997zntgvravfagsks6w0ryud3rylh4cdvayry0dl97nsjzf3yp units: 1536
summary (*actions.FillOrder): [2.000000000 TKN -> 20
27grFs9vE2YP9kwLM5hQJGLDvqEY9ii71zzdoRHNGC4Appavug (remaining: 30
27grFs9vE2YP9kwLM5hQJGLDvqEY9ii7 1zzdoRHNGC4Appavug)] height:15 txs:1 units:464
root:u2FyTtup4gwPfEFybMNTgL2svvSnajfGH4QKqiJ9vpZBSvx7q avg TPS:0.036967
    Lsad3MZ8i5V5hrGcRxXsghV5Glola9XStHY3bYmg7ha7W511e
actor:tokenlrvzhmceq997zntgvravfagsks6w0ryud3rylh4cdvayry0dl97nsjzf3yp units: 464
summary (*actions.CloseOrder): [orderID: 2Qbl
72jGBtjTTLhrzYD8ZLatjg6FFmbiFSP6CBq2Xy4aBV2WxL]
```

2. Transferring Assets to Another Subnet

In some embodiments, a transfer between two subnets can be performed by running the following command:

./build/token-di action export

An example of output generated by the command is as follows:

```
database: .token-cli
  address: tokenlrvzhmceq997zntgvravfagsks6w0ryud3rylh4cdvayry0dl97nsjzf3yp
  chainID: Em2pZtHr7rDCzii43an2bBilM2mTFyLN33QP1Xfjy7BcWtaH9
  assetID (use TKN for native token): TKN
  balance: 997.999988891 TKN
  recipient:
tokenlrvzhmceq997zntgvravfagsks6w0ryud3rylh4cdvayry0dl97nsjzf3yp
  amount: 10
  reward: 0
  available chains: 1
  excluded: [Em2pZtHr7rDCzii43an2bBilM2mTFyLN33QP1Xfjy7BcWtaH9]
  0) chainID:
cKVefMmNPSKmLoshR15Fzxmx52Y5yUSPqWiJsNFUg1WgNQVMX
  destination: 0
  swap on import (y/n): n
  continue (y/n): y
  txID: 24Y2zR2qEQZSmyaG1BCqpZZaWMDVDtimGDYFsEkpCcWYH4dUfJ
  perform import on destination (y/n): y
  22u9zvTa8cRX7nork3koubETsKDn43ydaVEZZWMGcTDerucq4b   to:
tokenlrvzhmceq997zntgvravfagsks6w0ryud3rylh4cdvayry0dl97nsjzf3yp source assetID: TKN
output
  assetID:   2rST7KDPjRvDxypr6Q4SwfAwdApLwKXuukrSc42jA3dQDgo7jx
value: 10000000000 reward: lO000000000return: false
  switch default chain to destination (y/n): y
```

In some embodiments, the export command may automatically run the import command on the destination. The minted token may be imported using a cross-chain messaging protocol.

3. Running a Load Test

Some embodiments enable a Token VM load test. As an example, the load test may provision 5 Token VMs and process 500 k transfers on each between 10 k different accounts. The load test may be activated by running the following command:

./scripts/tests.load.sh

In some embodiments, the load test may not include any network delay or consensus overhead. The load test may test the underlying performance of the hyper framework and the storage engine used. Before running this demo, the network should be stopped, using a command such as:

killall avalanche-network-runner.

Measuring Disk Speed

Some embodiments enable a disk speed test that is sensitive to disk performance. The disk speed test may be activated by running the following command:

./scripts/tests.disk.sh

The disk speed test writes/reads many GBs from the disk and may damage a disk if run too often. In some embodiments, the test is run in CI to standardize the result of all load tests.

Zipkin Tracing

Some embodiments trace the performance of Token VM during load testing, using tools such as OpenTelemetry and Zipkin, by running the following command inside hypersdk/trace:

docker-compose -f trace/zipkin.yml up

Once Zipkin is running, it can be visited at http://localhost:9411. Next, the load tester (which automatically sends traces to Zipkin) may be enabled by the command:

TRACE=true./scripts/tests.load.sh

When finished, it can be shut down by running the following command:

docker-compose -f trace/zipkin.yml down

Deploying to a Devnet

As used herein, the term "Devnet" refers to a test subnet. In some embodiments, a devnet may be used to programmatically deploy Token VM to a distributed cluster of nodes running on a custom network. Devnet deployment may include some or all of the following steps:

1. Install the command-line interface to setup nodes and install Custom VMs. The interface may be installed on Mac or Linux operating systems.

2. Install and configure a cloud services command line tool to set an access key while deploying the devnet.

3. Install the Token VM command line interface.

4. Download the Token VM package.

5. Plan a local network deployments.

6. Apply the local network deployment.

7. Generate configuration. Once the network and nodes are up, two subnets must be installed, each of which runs its own Token VM.

8. Install chains. Logs and metrics may also be viewed.

9. Initialize the token command line interface.

10. Start the integrated block explorer. This enables viewing of activity on each created subnet.

11. Run load.

12. SSH into nodes. The SSH key may be automatically generated.

13. Deploy another subnet. This is required for testing cross-subnet messaging.

Other Features for Token VM

Some embodiments provide config options for determining which order books to store in memory.

Some embodiments provide an option to CLI to fill up to some amount of an asset as long as it is under some exchange rate. A trading agent command may provide a better user interface.

Some embodiments add expiring order support. An order can't be filled after some point in time, but the order still needs to be explicitly closed to get the funds back.

Some embodiments add a lockup fee for creating a cross-subnet message and reclaim the lockup with a refund action. This enables "user-driven" acks on messages, which may remain signable and in state until a refund action is issued.

Third Example/Use Case Application: Index VM

Another exemplary hyper VM of some embodiments is an Index VM, for building complex on-chain mechanisms. The Index VM may be used to increase the usefulness of the world's content-addressable data (like IPFS) by enabling anyone to "index it" by providing useful annotations (e.g., ratings, abuse reports, etc.) on it. An up/down vote could be performed on any static file on the decentralized web. The transparent data feed generated by interactions on the Index VM can then be used by anyone to build an AI/recommender system to curate things people might find interesting, based on their previous interactions/annotations.

Some social media platforms may use arbitrary interplanetary file system (IPFS) data (like NFTs) but all a user's previous interactions (across all services they have ever used) can be used to generate the next content recommendation for them. The fastest way to expedite the transition to a decentralized web is to make it more fun and more useful than the existing web. The Index VM enables anyone in the network to generate world-class recommendations for anyone else, even if they have never interacted with each other before.

Some embodiments of Index VM have the following modules, components, and/or utilities:

Terminology

Searcher: looks for interesting content on the decentralized web and records it on-chain, earning a reward when their content is referenced.

Servicer: recommends data to Users by analyzing historical on-chain data.

Users: rate content discovered by Searchers and recommended by Servicers.

In different embodiments, any of these participants may be a single entity or may be different entities. A servicer may also search for content, for example. It is possible for an AI wizard (e.g., a Servicer) to provide recommendations to Users but be unable to actually find the interesting and useful content they are recommending.

Features of Index VM

1. Generic On-Chain Metadata Storage

In some embodiments, Index actions may be used to persist arbitrary content (e.g., up to 1.6 KB) in state for other participants to ingest and reference. Each uploaded content may be given a canonical identifier (e.g., the hash of parent+content) and the Index VM may reject the indexing of identical content by other participants. A goal of the Index VM in some embodiments is to make decentralized data more useful, not to be the storage layer for all decentralized data, so the Index VM may bound arbitrary data storage to a size that is sufficient for storing references/annotations of data on other storage mediums.

In some embodiments, the Index VM may offer best-effort storage of large files over the hypersdk's network layer.

2. User-Defined Data Schema

In some embodiments, when persisting some content to state using an Index action, the submitter provides a Schema to describe the content. This schema may be user-defined and can be any 32-byte value but is generally advised to be the hash of some human-readable value. Requiring all index events to specify a schema makes it easier for data indexers and recommenders to filter by content and to employ custom parsers that can read arbitrary data or skip it if it doesn't adhere to an expected format.

3. Native Data Linking

In some embodiments, each Index action can optionally specify a parent that it is associated with. This allows anonymous participants to build on the activity or discoveries of others in a structured manner that allows anyone ingesting the activity feed to recognize without parsing an action's Content. Linking to content is a common activity on the Index VM, and one interaction pattern for some Users may be to provide a "rating" of some parent that they were recommended.

4. Enforceable Rewards

Searching for interesting content on the decentralized web and uploading it to a deployment of the Index VM requires an investment of time, talent, and resources. To reward searchers for interesting discoveries, in some embodiments, the Index VM enables Searchers to enforce that any content that references content they uploaded must pay some uploader-specified fee.

5. Avoiding Fees: "Voting for CopyCats"

Users, acting in their own best interest to get the best recommendations, should not seek "copycat" content from cheaper, alternative sources because submitting ratings for nearly identical objects (which have different IDs than the original content) will result in strictly worse future recommendations.

Most recommender systems today utilize some derivative of collaborative filtering, which provides content recommendations based on the shared overlap of preferences of a user with other users instead of using any information about the object the user votes on. Voting for copies with minute changes (which would have different IDs) is the equivalent of voting for "new" content to these algorithms, not similar data going by a different moniker. This type of voting effectively reduces the overlap with other like-minded users and makes it more difficult for the collaborative filtering algorithm analyzing a user's past activity to recommend enjoyable content. The best content discoverers would not be incentivized to continue uploading their discoveries if they weren't paid fairly for doing so.

6. State Bloat Fee

Some embodiments of the Index VM enable the sender of any transaction (often called the Actor) to lock State Lockup funds for each item that they add to state. These funds are then unlocked when the state previously added is removed. This experimental mechanism properly charges participants for the additional strain their allocation of additional state puts on the rest of the network (slower block execution, slower state sync, more disk usage, etc.).

In some embodiments, not all StateLockup funds may be refunded to an Actor when an object is removed from state. Although there are already fees for removing state objects, they may not be enough to discourage a malicious participant from rapidly adding/removing objects to increase block verification time (i.e. target modification of the underlying chain state may be underpriced).

7. Inherited Features from the Hypersdk

The Index VM, a hyperVM focused on indexing decentralized data, inherits the features and performance characteristics of the underlying hypersdk framework it builds on. This means that the Index VM may get state sync, optimized block execution, nonce-less transactions, and support for generic storage backends, etc. out-of-the-box.

Actions

Examples of Actions according to some embodiments are described below.

1. Authorize

The Authorize action enables any account owner to grant another account owner granular permissions over their account. This is useful when creating server-based searchers that only have the ability to add new content but not transfer funds. Additionally, this action can be used to rotate the admin key of an account (give all privileges to new key, revoke all privileges from current key). An example of the Authorize action is provided below, according to some embodiments.

```
Type Authorize struct {
    // Actor must be specified so we can enumerate read keys
    Actor crypto.PublicKey 'json:"actor"'
    // Signer is the new permissions
    // Any balance pull must come from actor to
    // avoid being able to steal other's money.
    Signer crypto.PublicKey 'json:"signer"'
    ActionPermissions uint8 'json:"actionPermissions"'
    MiscPermissions uint8 'json:"miscPermissions"'
}
```

2. Clear

The Clear Action transfers all funds in an account to another account and deletes it from state. This state deletion also refunds the LockupState to [To]. An example of the Authorize action is provided below, according to some embodiments.

```
Type Clear struct {
    // To is the recipient of [Actor]'s funds
    To crypto.PublicKey 'json:"to"'
}
```

3. Index

The Index action is the main interaction on the Index VM. It may be used both for recording new content (by Searchers) and for rating existing content (by Users). Because it is common for Users to get recommendations from Servicers, it is also possible to pay a commission to Servicers when logging a rating (instead of needing to send an additional transfer). Servicers typically require some commission per number of recommendations to cover the cost of running their recommender systems.

Some embodiments enforce a Royalty fee that must be paid when referencing Content, because Users have no need to do so for their individual ratings (which would not likely be referenced in the regular course of actions). This also means that each of their ratings don't lock LockupState of their balance (like it does for Searchers that upload discovered content).

An example of the Index action is provided below, according to some embodiments.

```
Type Index struct {
    // REQUIRED
    // Schema of the content being indexed
    Schema ids.ID 'json:"schema"'
    // Content is the indexed data that will be associated with the ID
    Content [ ]byte 'json:"content"'
    // OPTIONAL
    // Royalty is the amount required to reference this object as a parent in
    // another [Index]
    // If this value is > 0, the content will be registered to receive rewards
```

-continued

```
    // and the creator will need to lock up [Genesis.ContentStake]. To
    // deregister from receiving rewards and to receive their
    // [Genesis.ContentStake] back, issue an [UnindexTx].
    // If this value is 0, the content will not be registered to
    // receive rewards
    Royalty uint64 'json:"royalty"'
    // Parent of the content being indexed (this may be nested)
    // This can also be empty if there is no parent (first reference)
    Parent ids.ID 'json:"parent"'
    // Searcher is the owner of [Parent]
    // We require this in the transaction so that the owner can be
    // prefetched during execution.
    Searcher crypto.PublicKey 'json:"searcher"'
    // Servicer is the recipient of the [Invoice] payment
    // This is not enforced anywhere on-chain and is up to the transaction
    // signer to populate correctly. If not populate correctly, it is likely that
    // the service provider will simply stop serving the user.
    Servicer crypto.PublicKey 'json:"servicer"'
    // Commission is the value to send to [Servicer] for their work
    // in surfacing the content for interaction
    // This field is not standardized and enforced by a [Servicer] to provide
    // user-level flexibility. For example, a [Servicer] may choose to offer
    // a discount after performing so many interactions per month.
    Commission uint64 'json:"commission"'
}
```

4. Modify

The Modify action may be used to modify the Royalty that must be paid when referencing Content in an Index action. Searchers may lower the price of old content that is no longer frequently referenced in a bid to capture more revenue (Servicers may prefer to serve "affordable" content to Users). An example of the Modify action is provided below, according to some embodiments.

```
Type Modify struct {
    // Content is the content to update
    Content ids.ID 'json:"content"'
    // Royalty is the new value to apply to the content
    Royalty uint64 'json:"royalty"'
}
```

5. Transfer

The Transfer action on the Index VM may be used to transfer funds to any other account. If the recipient doesn't exist, the account is created, LockupState funds are locked, and the default permissions are assigned to the crypto.PublicKey recipient. An example of the Transfer action is provided below, according to some embodiments.

```
Type Transfer struct {
    // To is the recipient of the [Value].
    To crypto.PublicKey 'json:"to"'
    // Amount are transferred to [To].
    Value uint64 'json:"value"'
}
```

6. Unindex

The Unindex action removes a previously uploaded piece of Content from state. This is useful when Content is no longer referenced by others and a Searcher Feels uploading a new piece of content could be more profitable (so they use the LockupFunds locked here elsewhere). An example of the Unindex action is provided below, according to some embodiments.

```
Type Unindex struct {
    // Content is the content to unindex
    // This transaction will refund [Genesis.ContentStake] to the the
    // creator of content.
    Content ids.ID 'json:"content"'
}
```

Authentication

1. Direct

Direct authentication is just a Signature for a given Signer. The Signer will be the Actor in any Action they authenticate. An example of the Direct action is provided below, according to some embodiments.

```
Type Direct struct {
    Signer crypto.PublicKey 'json:"signer"'
    Signature crypto.Signature 'json:"signature"'
}
```

2. Delegate

Delegate authentication lets the Signer serve as the Actor of some Action if the Actor previously authorized them to do so. This makes it possible, for example, for a Signer to index data on the behalf of another Actor and for that Actor to then revoke the Signer without losing the reputation they built up. This may be useful for Actors that use external servers to upload new content and don't want to give those servers the ability to transfer funds. An example of the Delegate action is provided below, according to some embodiments.

```
Type Delegate struct {
    Actor crypto.PublicKey 'json:"actor"'
    Signer crypto.PublicKey 'json:"signer"'
    Signature crypto.Signature 'json:"signature"'
    ActorPays bool 'json:"actorPays"'
}
```

Running the Index VM

1. Load Test

Some embodiments enable a load test. As an example, the Index VM load test may provision 5 Token VMs and process 500 k transfers on each between 10 k different accounts. The load test may be activated by running the following command:

./scripts/tests.load.sh

2. Running an Integration Test

Some embodiments enable an integration test. As an example, the The Index VM integration test may run through a series of complex on-chain interactions and ensure the outcome of those interactions is expected. The load test may be activated by running the following command:

./scripts/tests.integration.sh

3. Running an End-to-End (E2E) Test

Some embodiments enable an E2E test. As an example, the The Index VM E2E test may spins up 5 nodes and performs a simple transfer. The E2E test may be activated by running the following command:

MODE=test./scripts/run.sh

A full suite of sync tests, where state syncs new nodes while thousands of blocks are being processed concurrently, may be activated by running the following command:

MODE=full-test./scripts/run.sh

4. Local Network

For local experimentation, 5 nodes can be spun up by default, and log how they can be accessed, by running the following command:

./scripts/run.sh

Example Applications of Index VM

Example applications are useful to showcase the capability of the Index VM These examples include but are not limited to an NFT searcher, a meme searcher, a generic recommendation server, and a CLI-based content viewer and voter.

Zipkin Tracing

Some embodiments trace the performance of Index VM during load testing, using tools such as OpenTelemetry and Zipkin, by running the following command inside hypersdk/trace:

docker-compose -f trace/zipkin.yml up

Once Zipkin is running, it can be visited at http://localhost:9411. Next, the load tester (which automatically sends traces to Zipkin) may be enabled by the command:

TRACE=true./scripts/tests.load.sh

When finished, it can be shut down by running the following command:

docker-compose -f trace/zipkin.yml down

Other Features for Index VM

Some embodiments provide cleanup E2E tests, to simplify duplicated code.

Some embodiments make LockupFunds proportional to the size of state being stored.

Some embodiments increase MaxContentSize.

Some embodiments make the LockupFunds refund less than LockupFunds.

Some embodiments provide best-effort storage mechanism for large files using a Distributed Hash Table (DHT) running on top of the hypersdk networking layer.

Some embodiments add support for sending assets between different Index VMs.

REFERENCES

[1] Young, Martin, "Avalanche's HyperSDK blockchain upgrade hits 143K TPS on testnet," https://cointelegraph-.com/news/avalanche-hyper-sdk-blockchain-upgrade-hits-143000-tps-on-testnet, accessed May 5, 2024.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one or each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

44

The invention claimed is:

1. A method for blockchain management, comprising:
receiving a first definition for a customizable blockchain on a blockchain platform comprising a plurality of blockchains, the first definition for the customizable blockchain comprising definitions for a plurality of default data structures and a definition for a controller interface to initialize the default data structures;
initializing a virtual machine and configuring the virtual machine using the first definition for the customizable blockchain;
receiving a second definition for the customizable blockchain, the second definition for the customizable blockchain comprising definitions for a plurality of user-defined data structures;
further configuring the virtual machine using the second definition for the customizable blockchain, wherein one or more of the user-defined data structures may override one or more of the default data structures;
executing the customizable blockchain on the virtual machine;
receiving new blockchain data; and
in response to receiving the new blockchain data, performing a consensus operation to update a current state of the customizable blockchain without performing a validation operation on the new blockchain data,
wherein the second definition for the customizable blockchain comprises a definition for a plurality of blockchain actions that define how a user customizes or interacts with the customizable blockchain.

2. The method of claim 1, wherein the controller interface initializes the default data structures during a configuration of the virtual machine using the first definition.

3. The method of claim 1, wherein the first definition comprises a definition for a genesis interface that defines a list of initial account balances and a list of default configurations after the virtual machine is initialized.

4. The method of claim 1, further comprising:
storing, in a data structure, data associated with the current state of the customizable blockchain; and
deleting, from the data structure, data that is no longer part of the current state.

5. The method of claim 4, further comprising synchronizing only most recent state data to the blockchain platform.

6. The method of claim 1, further comprising:
receiving a web assembly binary file comprising a smart contract;
extracting the smart contract from the web assembly binary file; and
executing the smart contract.

7. The method of claim 1, wherein the second definition comprises a definition for an auth interface that defines authentication rules for blockchain actions.

8. The method of claim 7, wherein the auth interface defines an actor that participates in a particular blockchain action, and further defines a sponsor that pays fees associated with the particular blockchain action.

9. The method of claim 1, wherein the default data structures further configure the virtual machine to execute transactions in parallel and to perform deferred root generation.

10. The method of claim 9, wherein the default data structures further configure the virtual machine to perform parallel signature verification and to perform batch signature verification.

11. The method of claim 1, wherein the default data structures further configure the virtual machine to perform multidimensional fee pricing for transactions executed on the virtual machine.

12. A non-transitory computer-readable medium storing a program for blockchain management, which when executed by a computer, configures the computer to:

receive a first definition for a customizable blockchain on a blockchain platform comprising a plurality of blockchains, the first definition for the customizable blockchain comprising definitions for a plurality of default data structures and a definition for a controller interface to initialize the default data structures;

initialize a virtual machine and configure the virtual machine using the first definition for the customizable blockchain;

receive a second definition for the customizable blockchain, the second definition for the customizable blockchain comprising definitions for a plurality of user-defined data structures;

further configure the virtual machine using the second definition for the customizable blockchain, wherein one or more of the user-defined data structures may override one or more of the default data structures;

execute the customizable blockchain on the virtual machine;

receive new blockchain data; and in response to receiving the new blockchain data, perform a consensus operation to update a current state of the customizable blockchain without performing a validation operation on the new blockchain data, wherein the second definition for the customizable blockchain comprises a definition for a plurality of blockchain actions that define how a user customizes or interacts with the customizable blockchain.

13. The non-transitory computer-readable medium of claim 12, wherein the second definition comprises an action interface that defines how a user interacts with the customizable blockchain, the action interface defining a plurality of blockchain actions, wherein the second definition comprises an auth interface that defines authentication rules for blockchain actions, wherein the auth interface further defines an actor that participates in a particular blockchain action, and further defines a sponsor that pays fees associated with the particular blockchain action.

14. The non-transitory computer-readable medium of claim 12, wherein the first definition comprises a definition for a genesis interface that defines a list of initial account balances and a list of default configurations after the virtual machine is initialized.

15. The non-transitory computer-readable medium of claim 12, wherein the program, when executed by the computer, further configures the computer to:

store, in a data structure, data associated with the current state of the customizable blockchain; and delete, from the data structure, data that is no longer part of the current state.

16. The non-transitory computer-readable medium of claim 15, wherein the program, when executed by the computer, further configures the computer to synchronize only most recent state data to the blockchain platform.

17. The non-transitory computer-readable medium of claim 12, wherein the program, when executed by the computer, further configures the computer to:

receive a web assembly binary file comprising a smart contract;

extract the smart contract from the web assembly binary file; and execute the smart contract.

18. A system for blockchain management, comprising:

a processor; and a non-transitory computer-readable medium storing a set of instructions, which when executed by the processor, configure the processor to:

receive a first definition for a customizable blockchain on a blockchain platform comprising a plurality of blockchains, the first definition for the customizable blockchain comprising definitions for a plurality of default data structures and a definition for a controller interface to initialize the default data structures;

initialize a virtual machine and configure the virtual machine using the first definition for the customizable blockchain;

receive a second definition for the customizable blockchain, the second definition for the customizable blockchain comprising definitions for a plurality of user-defined data structures;

further configure the virtual machine using the second definition for the customizable blockchain, wherein one or more of the user-defined data structures may override one or more of the default data structures;

execute the customizable blockchain on the virtual machine;

receive new blockchain data; and in response to receiving the new blockchain data, perform a consensus operation to update a current state of the customizable blockchain without performing a validation operation on the new blockchain data, wherein the second definition for the customizable blockchain comprises a definition for a plurality of blockchain actions that define how a user customizes or interacts with the customizable blockchain.

* * * * *